United States Patent [19]

Morgan

[11] Patent Number: 4,504,146
[45] Date of Patent: Mar. 12, 1985

[54] RING LASER GYRO SYSTEM

[75] Inventor: Avery A. Morgan, St. Petersburg, Fla.

[73] Assignee: Honeywell Inc., Minneapolis, Minn.

[21] Appl. No.: 280,770

[22] Filed: Jul. 6, 1981

[51] Int. Cl.³ .............................................. G01C 19/64
[52] U.S. Cl. .................................................. 356/350
[58] Field of Search ........................................ 356/350

[56] References Cited
U.S. PATENT DOCUMENTS
4,344,706 8/1982 Ljung et al. ......................... 356/350

Primary Examiner—Vincent P. McGraw
Attorney, Agent, or Firm—Robert A. Pajak

[57] ABSTRACT

A laser gyro system is disclosed wherein the lock-in error associated with the sensor signal deriving phase information of the phase relationship between a pair of lasing beams therein is accounted for and utilized for correction and/or control.

45 Claims, 19 Drawing Figures

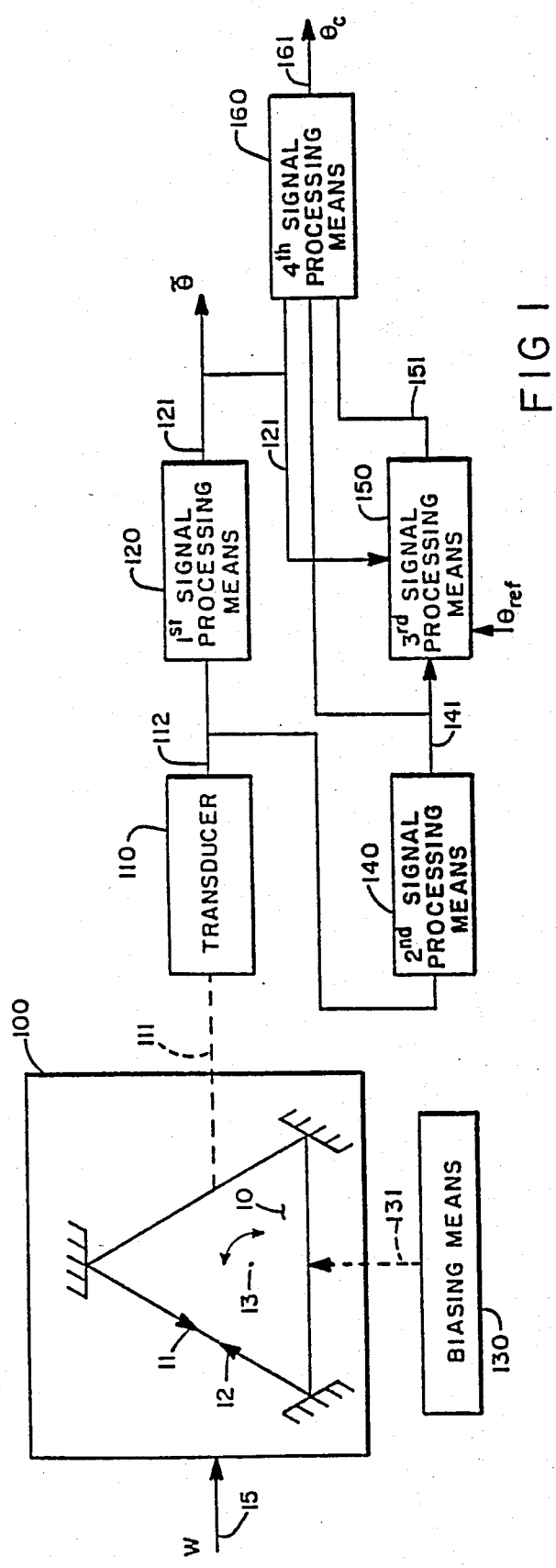
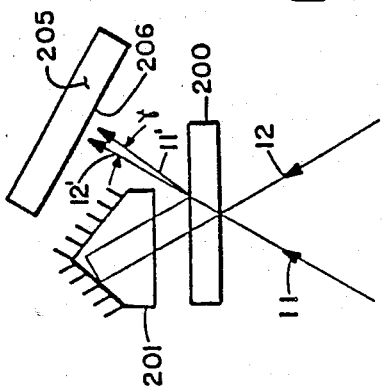
FIG 1
FIG 2

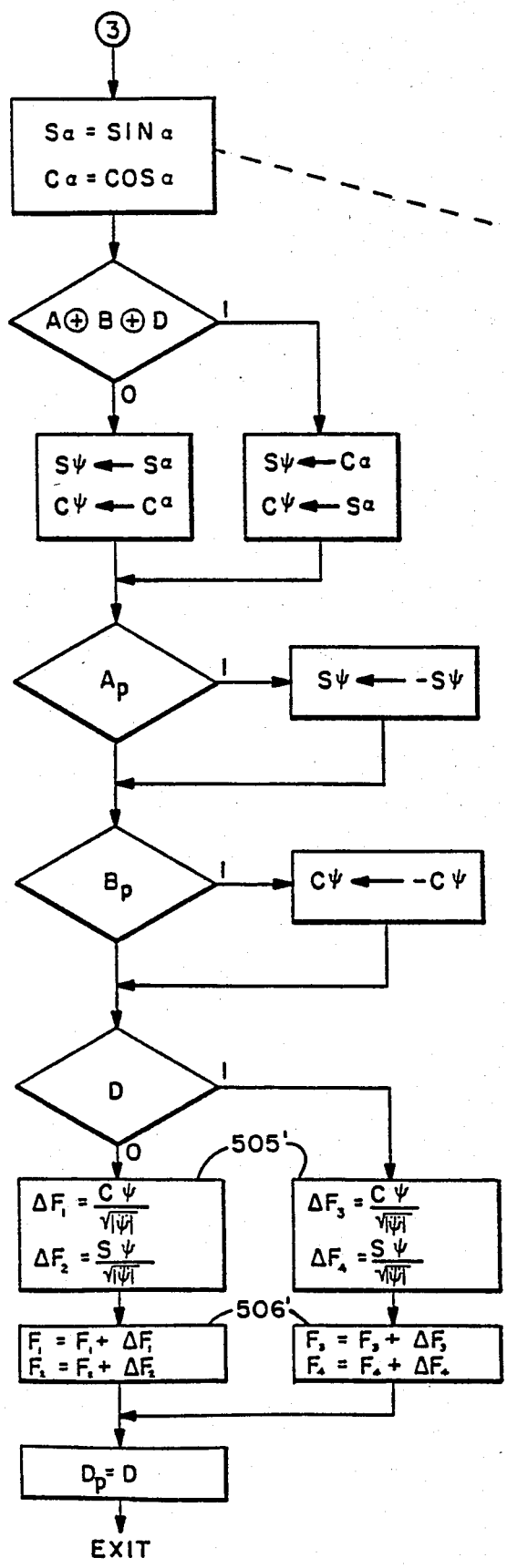
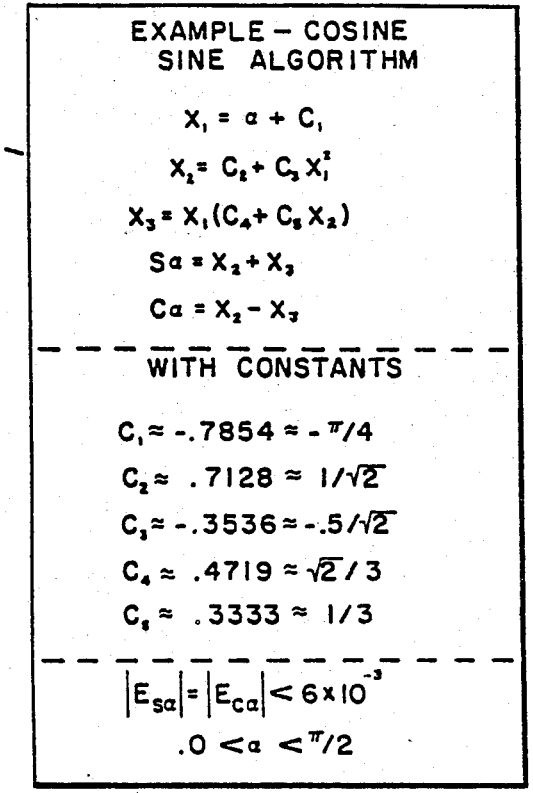
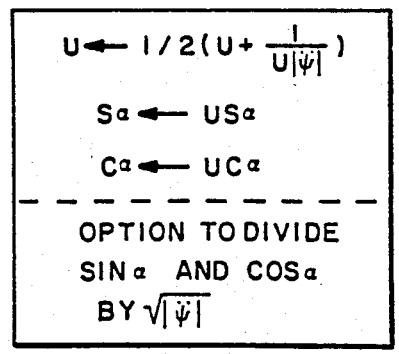
FIG 7C

RING LASER GYRO SYSTEM

Reference is hereby made to a copending application by Werner Egli, entitled "Error Cancelling Biasing System" having Ser. No., 280,955, an application by Avery Morgan, entitled "Ring Laser Gyro System" having Ser. No. 280,423, and an application by Allan Johnson, entitled "Dither System for a Spring-Mass System" having Ser. No. 280,954, now U.S. Pat. No. 4,445,779, which were all filed on even date with the present application and which are all assigned the same assignee as the present application. Reference is also hereby made to U.S. Pat. No. 3,373,650, by J. E. Killpatrick, entitled, "Laser Angular Rate Sensor", and U.S. Pat. No. 3,467,472, by J. E. Killpatrick, entitled, "Random Bias For Laser Angular Rate Sensor", U.S. Pat. No. 3,627,425 by B. Doyle, entitled "Laser Gyroscope Biasing Apparatus", and U.S. Pat. No. 4,152,071, by Theodore J. Podgorski, entitled, "Control Apparatus" which also are all assigned to the same assignee as the present application.

BACKGROUND OF THE INVENTION

The present invention relates to the class of angular rate sensors wherein two waves propagate or travel in opposite directions in a closed-loop path and which include biasing systems for minimizing the effects of lock-in caused by back scattering. In particular, the present invention provides a novel method of accounting for inherent errors typically included in sensors of this type whereby the sensors may be controlled so as to reduce the magnitude of error, or the sensor output can be corrected or compensated for the error.

In a simple laser angular rate sensor, sometimes referred to as a ring laser gyro, two counter-traveling waves are provided by two waves or beams of substantially monochromatic electromagnetic radiation, usually two monochromatic beams of light. The two light beams are generated so as to travel in opposite directions along a closed-loop path which typically, through not necessarily, encloses the input axis about which rotation is to be sensed. When the sensor is at rest, the lasing path is identical for the oppositely traveling beams resulting in the frequency of oscillation of each beam being identical. Rotation of the ring laser gyro, particularly rotation of the closed-loop path, about the input axis causes the effective lasing path length travelled by one beam to increase, while the effective lasing path length travelled by the other beam to decrease. The resulting change in path length of the two beams produces a frequency change in each of the beams, one increasing and the other decreasing, since the frequency of oscillation of the beam of electromagnetic radiation in such systems is dependent upon the effective length of the lasing path. The frequency difference between the two beams is therefore indicative of rotation rate of the beams of light, i.e. the rotation rate of the closed-loop path about the input axis. A frequency difference between the two beams results in a phase shift between the counter-traveling beams which changes at a rate proportional to the frequency difference. Thus, phase shift between the two beams is proportional to the time integral of the frequency difference, and is representative of the time integral of the input rotation rate about the gyro input axis. The total phase shift over a time interval is, therefore, indicative of the total angular displacement about the gyro input axis during the integrated time interval, and the rate of change of phase shift thereof is indicative of the rate of rotation about the gyro input axis.

A bothersome characteristic of the ring laser gyro is "lock-in". At rotation rates about the input axis of the ring laser gyro below some critical value called the lock-in threshold or lock-in rate, the frequency difference between the oppositely traveling beams synchronize to a common value resulting in the frequency difference being zero indicating no rotation at all. The lock-in characteristic arises due to mutual coupling between the oppositely traveling waves. The dominant source of the coupling is mutual scattering of energy from each of the beams into the direction of the other. The effect is similar to lock-in coupling effects which have been long understood in conventional electronic oscillators.

Of course, any inability to accurately measure low rotation rates reduces the effectiveness of a laser angular rate sensor in navigational systems. Thus, much developmental work has been conducted in the field of laser angular rate sensors for purposes of reducing or eliminating the effects of "lock-in" so that the laser angular rate sensor may be more effectively used in navigational systems. A major advancement in this area was disclosed in U.S. Pat. No. 3,373,650, wherein a biasing system was provided which introduced a varying bias in the frequency of at least one of the counter-traveling beams of electromagnetic energy causing a varying frequency difference between the oppositely traveling beams of electromagnetic radiation, the bias being such that the varying frequency difference alternated in sign. The frequency bias so provided is such that there exists a frequency difference between the two oppositely traveling beams which is greater than the frequency difference which occurs near the lock-in rate for a majority of time. The sign or polarity of the frequency difference is alternated, typically periodically, so that the time integrated frequency difference between the two beams integrated over the time interval between sign reversals reversing from the same sign direction is substantially zero. Note that at those instances of time when the sign or direction of the frequency difference reverses, the two beams will tend to lock-in since at some point the frequency difference there between is zero. Since the gyro output angle is generally derived from the frequency difference which locks in to zero, even though there exists some rotation, an error accumulates in the gyro output angle. The periods of time when the two beams are "locked-in" usually are very short time intervals, and any possibly resulting gyro output angle error resulting therefrom is greatly reduced. Nevertheless, the error resulting from these periods of time during lock-in corresponding to each sign reversal of the frequency difference accumulate in the gyro output angle signal, and in time can amount to a bothersome level, particularly in precision navigational systems. This error is sometimes referred to as random walk or random drift.

The bias provided in such biasing systems as disclosed in U.S. Pat. No. 3,373,650, is sometimes referred to as dither, and a ring laser gyro having such dither is referred to as a dithered gyro. Hereafter, a dithered gyro is one in which a bias is introduced into the frequencies of the counter-traveling beams whereby the frequency difference between the beams varies with time and alternates in sign. The alternation in sign need not be periodic in nature, i.e. not perfectly repetitious.

The bias introduced may be provided by inertial rotation of the gyro (mechanical dithering) or may be provided by directly affecting the counter-traveling beams (electrical or optical dithering).

Many improvements have been made to the basic dithered gyro disclosed in U.S. Pat. No. 3,373,650. One such improvement is disclosed in U.S. Pat. No. 3,467,472 wherein the improvement consists of randomly changing the amount of bias introduced into the counter-traveling beams in order to reduce the random walk resulting from those time intervals when the frequency of the beams are locked-in.

Heretofore, prior art dithered ring laser gyros do not determine the contribution of lock-in and other such light scattering errors which are included in the gyro output angle so that either compensation can be provided, or additional gyro control can be employed to reduce the error included in the gyro output angle derived from information of the two counter-traveling beams therein.

SUMMARY OF THE INVENTION

The present invention utilizes an incremental error parameter related to the instantaneous phase difference between the two counter-traveling beams of a ring laser angular rate sensor in order to generate a set of error parameters which correspond to the contribution of lock-in error included in the output of the sensor. The error parameters can be used for compensation of the gyro output for the lock-in error, or the parameters can be used in a control loop for indirectly reducing the error contained in the sensor output, or a combination of both error reduction and compensation.

DESCRIPTION OF THE DRAWINGS

FIG. 1 is a block diagram of one embodiment of the present invention.

FIG. 2 is a diagramatic representation of a typical output scheme used in a ring laser gyro.

FIGS. 7a–c are flow diagrams of the signal processing system of FIG. 6.

DESCRIPTION OF THE INVENTION

Figure 5:
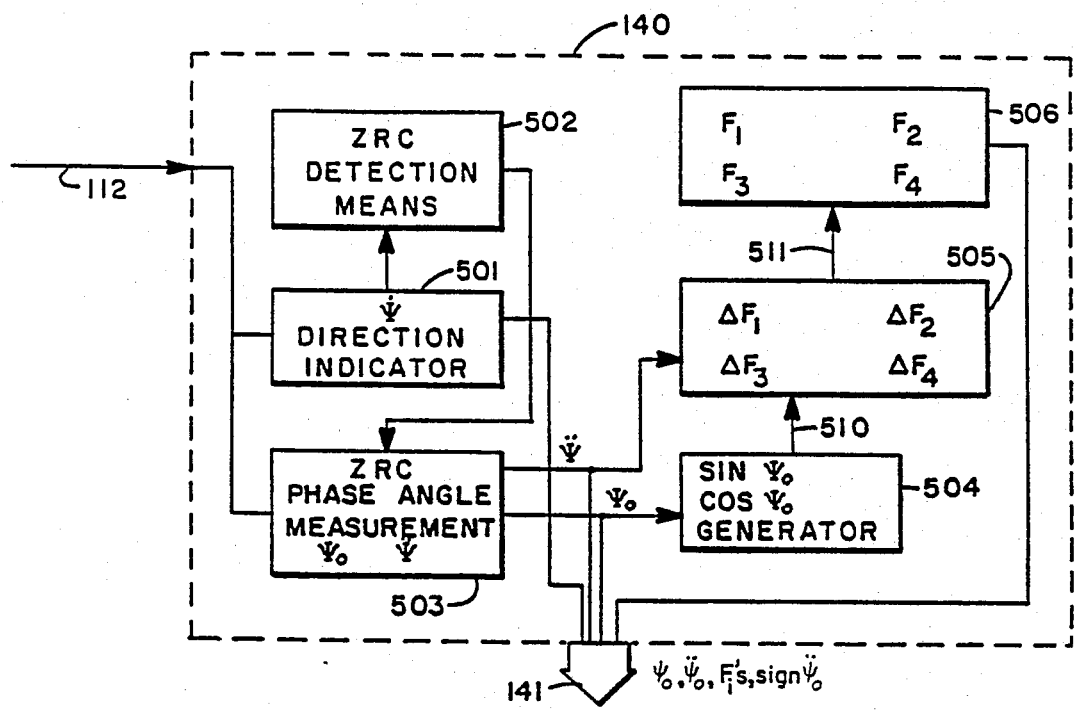
FIG. 5 is a block diagram of a portion of a signal processing system of FIG. 1.

A general block diagram of the present invention is shown in FIG. 1. Block 100 represents a ring laser gyro. Illustrated within Block 100 is a triangular closed-loop path lying in a plane on a base, 10, for supporting an assembly of mirrors which form the closed-loop path. Beams of substantially monochromatic electromagnetic radiation traveling in opposite directions about the closed-loop path are indicated by arrows 11 and 12. Rotation is sensed about the input axis 13. Line 15 represents inertial space base motion which is to be sensed by ring laser gyro 100. Inertial space base motion is to be distinguished from any other motion which ring laser gyro 100 may be subjected to, for example, mechanical dithering, herein referred to as dither motion. The ring laser gyro configuration illustrated by block 100 in FIG. 1 is similar to that described in U.S. Pat. No. 3,373,650. Other ring laser gyro configurations different than that described by U.S. Pat. No. 3,373,650 can be used with the invention of the present application. Although U.S. Pat. No. 3,373,650 shows a triangular closed-loop path, my invention is not restricted to such configuration, and may be applied to rectangular closed-loop paths as well, and other such closed-loop configurations.

Transducer 110 is shown coupled to ring laser gyro 100 through coupling means 111. Transducer 110 provides an electrical signal or signals which represent the characteristic behavior of one or both of the counter-traveling beams. The electrical signals provided by transducer 110 provide sufficient information about the counter-traveling beams in order to ascertain the rotation about axis 13 of ring laser gyro 100. For example, transducer 110 can provide electrical signals indicative of the instantaneous phase difference between the two counter-traveling beams from which rotation information can be derived. A more detailed description of transducer 110 is provided below with reference to FIG. 2.

Electrical signals provided by transducer 110 are coupled to first signal processing means 120 and second signal processing means 140 through transducer output connecting means 112. First and second signal processing means 120 and 140 can be combined in a single processing unit but are shown separated in FIG. 1 for exposition purposes.

First signal processing means 120 is responsive to selected ones of electrical signals provided by transducer 110 on connecting means 112. First signal processing means processes the information provided by transducer 110 and provides an output signal representative of the rotation about the laser gyro input axis 13. The information so provided by transducer 110 is the response of the counter-traveling beams caused by any rotation, i.e. inertial space base motion 15 and/or dithering, or any disturbance affecting the counter-traveling beams including optical biasing such as provided by a dithered Faraday cell as disclosed in U.S. Pat. No. 3,373,650. The first signal processing means output signal includes a lock-in error caused by the lock-in phenomenon inherent in sensors of the class described. First signal processing means is well known in the art and is disclosed in the above referred to patents, and will not be described in detail.

As indicated earlier, disclosed in U.S. Pat. No. 3,373,650 is a ring laser gyro in which the frequencies of the two counter-traveling beams of light are provided with a periodically reversing or altering bias so that a time varying frequency difference exists therebetween for a majority of the time so that the time integrated frequency difference between the two beams of light is substantially zero after one complete cycle of the periodically alternating bias. Shown in FIG. 1 is a biasing means indicated by block 130 coupled to ring laser gyro 100 through coupling means 131 for introducing a time varying bias in the frequency of at least one of the counter-traveling beams thereby causing a time varying frequency difference between the two counter-traveling beams which alternates in sign. The bias provided by biasing means 130 need not be periodic, that is, perfectly repetitious, but rather provide a bias which causes the frequency difference between the counter-traveling beams to change sign in regular, though not necessarily periodic, intervals. For purposes of ease of exposition, and as a matter of practicality, biasing means 130 will hereafter be considered periodic in nature.

As disclosed in U.S. Pat. No. 3,373,650, the periodically alternating bias may be achieved mechanically by providing a real rotational motion of the gyro about the input axis, or may be achieved by directly effecting a frequency change in the two counter-traveling beams by, for example, directly affecting the lasing path or lasing medium, these methods being referred to in U.S. Pat. No. 3,373,650 as electrically providing a bias. Thus, the biasing means shown by block 130 may be of the mechanical or electrical variety providing the periodically alternating bias.

Second signal processing means 140 is responsive to selected ones of electrical signals also provided by transducer 110 on output connecting means 112. First and second signal processing means, 120 and 140 respectively, may respond to the same signals or different signals provided by transducing means 110. Second signal processing means 140 responds to signals presented on connecting means 112 from transducer 110 and determines lock-in error parameters indicative of the lock-in error included in first signal processing means 120 output signal.

Second signal processing means 140 provides output signals representative of the lock-in error parameters to a third signal processing means, 150, through connecting means 141. Third signal processing means also receives output signals from first signal processing means 120, through connecting means 121, and signals representative of some arbitrary known angular rotations indicated by θ REF. Using these input signals, third signal processing means determines a characteristic signature of the particular ring laser gyro connected in the system. The signals indicated by θ REF may be, by example, actual magnitudes of discrete rotations of the sensor such as the earth's rotation, or may be some characterized input such as a ramp or the like. A detailed description of the second and third signal processing means, 140 and 150 respectively, and the lock-in error parameters and characteristic signature is provided below.

Signals representative of the lock-in error parameters provided by second signal processing means 140 and signals representative of the characteristic signature of the gyro provided by the third signal processing means 150 are presented to a fourth signal processing means 160 through connecting means 141 and 151 respectively. Fourth signal processing means 160 also receives signals from first signal processing means 120 through connecting means 121. Signals on connecting means 121 from first signal processing means 120 represent the gyro output including lock-in and other errors. Fourth signal processing means 160 combines the uncorrected gyro output data presented on connecting means 121, the lock-in error parameter signals presented on connecting means 141 from second signal processing means 140, and signals indicative of the characteristic signature of the gyro presented on connecting means 151 from third signal processing means 150, and provides an output signal indicative of the rotation of ring laser gyro 100 corrected for lock-in error. The corrected gyro output signal is provided by fourth signal processing means 160 at output terminating means 161. Fourth signal processing means 160, of course, can be combined with first, second, and third signal processing means 120, 140, and 150 respectively but have been distinguished from each other for exposition purposes.

The laser gyro assembly indicated by block 100 in FIG. 1 generally consists of a lasing medium providing two substantially monochromatic beams or waves of electromagnetic energy in the form of beams of light, a plurality of reflectors or mirrors defining a closed-loop path and an enclosed area, the two beams of light being directed to travel along the closed-loop path in opposite directions. One means of monitoring the behavior of the counter-traveling beams in order to determine the frequency difference therebetween, which is indicative of the rotation of the closed-loop path, is a system substantially shown in FIG. 2. One of the mirrors forming the closed-loop path in ring laser gyro 100 is slightly transparent and is indicated in FIG. 2 by mirror 200. The system shown in FIG. 2 is described in more detail in Patent 3,373,650 and will be briefly described here.

Referring to FIG. 2, a portion of the energy in beam 12 passes through mirror 200 and travels through combiner right angle prism 201 and reflects off of the backside of mirror 200 at the exit point where a portion of the energy of beam 11 passes through mirror 200. A portion of energy from beam 11 exiting from mirror 200 is indicated by beam 11', and the portion of energy of beam 12 reflecting off the backside of mirror 200 is indicated by beam 12'. The optical geometry of mirror 200 and right angle prism 201 is such that beams 11' and 12' are at a slight angle with each other. In these circumstances, an interference pattern is created on the surface 206 of detector 205. As is well known, the intensity of light on surface 206 is indicative of the instantaneous phase shift between the two counter-traveling beams 11 and 12. When laser gyro 100 is not rotating, the intensity at any point on the surface 206 remains constant. In the presence of rotation above the lock-in rate, the intensity changes with time between maximums and minimums at a rate proportional to the rotation rate sensed by laser gyro 100. In this manner, optical information is presented on the surface 206 of detector 205 for transduction into different signals such as electrical signals. The functions of mirror 200 and right angle prism 201 essentially make up one example of coupling means 111; detector 205 and the surface thereof, 206, essentially make up one example of transducer 110. One example of a detector using such a coupling means as just described will now be presented.

Figure 3A:
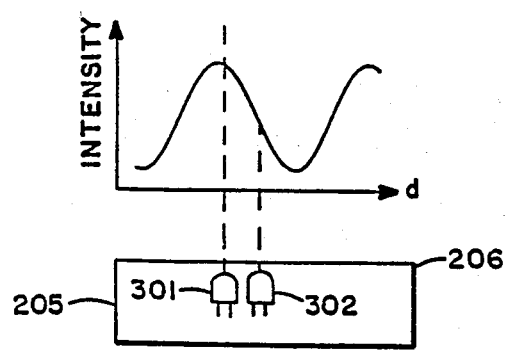
FIG. 3a–b graphically illustrates the signals presented to the detector scheme shown in FIG. 2.

Transducer 110 may be provided by one or more photodetectors positioned at the surface 206 of detector 205 shown in FIG. 2 and is more fully illustrated in FIG. 3a. Shown in FIG. 3a is detector 205 consisting of photodetectors 301 and 302. Indicated directly above photodetectors 301 and 302 is a graphical representation of a typical interference pattern that can be created on surface 206 by energy beams 11' and 12'. The graphical illustration is a plot of intensity of the combined beams versus distance along the surface 206 that may be observed by photodetectors 301 and 302. Although a single photodetector can be used to obtain rate of rotation information, a second photodetector is usually required to determine rotation direction. The combined beam intensity measured at the surface at a particular point on the surface of 206 gives a relative indication of the instantaneous phase difference between the two counter-traveling beams 11 and 12. This "relative phase difference" is clearly exemplified by noting the difference in intensity measured by photodetector 301 compared with the intensity measured by photodetector 302, two different points on the surface 206. The intensities measured by photodetectors 301 and 302 are, of course, relative since they depend upon the position on the surface 206.

Figure 3B:
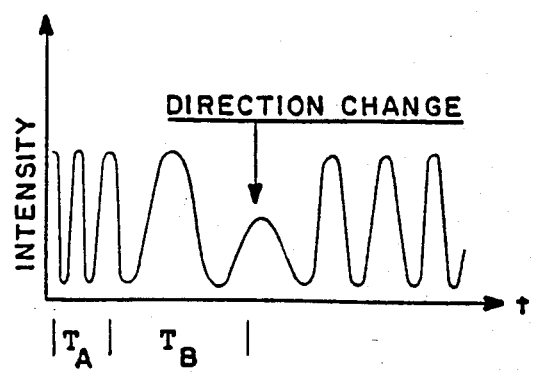

In the presence of rotation, the interference pattern moves with time as indicated in FIG. 3b. FIG. 3b is a graphical representation of the intensity measured, for example, by only photodetector 301 versus time. Note that the relatively fast rate of change of intensity indicated in the time interval indicated by TA is faster than the rate indicated during a time interval indicated by TB. The faster rate of change of intensity during time interval TA indicates a greater rotation rate than during time interval TB. In operation, the photodetector in transducer 110 will provide electrical signals directly related to the intensity of the interference pattern created on the surface 206. These signals are usually amplified and processed to determine the rotation rate about the axis 13 of ring laser gyro 100 as well as the angular displacement during selected time intervals for determining navigational position. As is indicated in FIG. 1, first signal processing means 120 provides the function of processing the electrical signals and having as an output the gyro output angle. Since the output signal of first signal processing means 120 is derived from the frequency behavior of the counter-traveling waves, the output signal thereof will include lock-in error.

One example of first signal processing means 120 for determining such information is a signal processing system which counts the interference pattern intensity maximums or minimums or portions thereof from at least one photodetector. The information is further processes as to rate of change of such maximums or minimums as well as whether they are in a positive or negative direction based on information from a second photodetector such as photodetector 302. In a dithered gyro, first signal processing means 120 generally will have the capability of filtering out the bias introduced into the frequency difference of the two counter-traveling beams which is introduced by biasing means 130. Examples of first signal processing means are disclosed in U.S. Pat. Nos. 3,373,650 and 3,627,425. The output of first signal processing means is a signal representative of at least the angular displacement about the gyro input axis 13 derived from signals representative of the behavior of the two counter-traveling beams therein. Hereafter, the output signal provided by first signal processing means, representative of gyro angular displacement or gyro output angle is referred to as the gyro output signal or simply "gyro output" and includes lock-in error.

In one embodiment of the invention, electrical signals, such as those presented to the first signal processing means 120 from, for example, photodetectors 301 and 302, are utilized to obtain lock-in error information in order to process the gyro output signal provided by first signal processing means and produce navigational information corrected for lock-in error.

To further understanding of the invention, an explanation of the nature and behavior of a dithered ring laser gyro is necessary. Ring laser gyros are sometimes referred to as integrating rate gyros. That is, the rotation rate is integrated for determining positional information with regard to the angular rotation about the input axis. This may be expressed by the following equation:

$$\theta = S\psi = S[f_2 - f_1] \tag{1}$$

where:
  $f_2$, $f_1$ are the individual frequencies of the two counter-traveling beams;
  S is a scale factor;
  $\psi$ is the rate of change in phase between the two counter-traveling beams; and
  $\theta$ is the gyro output angle, and $\dot{\theta}$ is the gyro output rate.

If the phenomenon of lock-in or other disturbances did not exist, then:

$$\dot{\theta} = \omega_{in} \tag{2}$$

where $\omega_{in}$ is the true or actual inertial rotation rate about the input axis regardless of the source.

However, because of lock-in, the gyro output rate contains an error due to at least lock-in. One mathematical expression which substantially describes the effects of lock-in upon the gyro output rate determined by the first signal processing means is represented by the following equation:

$$\dot{\theta} = \omega_{in} - \Omega_L \sin(\psi + \beta) \tag{3}$$

where:
  $\psi$ is the instantaneous phase angle between the two counter-traveling beams.
  $\Omega_L$ is the lock-in rate;
  $\beta$ is a phase angle measurement offset of the instantaneous phase angle $\psi$ and is presumed constant;

In equation (3), $\dot{\theta}$ is related to rate of change in $\psi$, $\dot{\psi}$, by the sensor scale factor:

$$\dot{\psi} = K\dot{\theta}$$

Further, the value of $\beta$ is dependent upon the placement of a defined reference photodetector for determining the instantaneous phase angle, $\psi$. This is so since the reference photodetector can be placed anywhere with respect to the interference pattern. Once the optical system is established, $\beta$ is presumed constant.

The following analysis is directed to the quantification of the incremental lock-in error generated in a dithered ring laser gyro system so as to arrive at a means for accumulating a total lock-in error associated with the gyro output angle provided by first signal processing means 120. And so, the lock-in error term in equation 3 is rewritten for exposition purposes in equation (4).

$$\delta\dot{\theta} = -\Omega_L \sin(\psi + \beta) \quad (4)$$

The transcendental expression for the gyro output angle rate shown in equation (4) is a function of the instantaneous phase angle between the two counter-traveling beams, a function of the sensor lock-in rate, and the phase angle measurement offset. In order to attempt a solution to equation (4) yielding an actual quantity of lock-in error rate, a time varying expression for the value of $\psi$ is first obtained.

Consider a biasing system similar to those disclosed in U.S. Pat. Nos. 3,373,650 and 3,467,472. In a mechanical biasing system, base 10 of ring laser gyro 100 is mechanically rotated in a back and forth motion in a periodic manner resulting in the frequency difference between the two counter-traveling beams to vary in a sinusoidal manner, periodically alternating in sign. In these circumstances, the instantaneous phase angle between the two counter-traveling beams continually increases in magnitude with time as base 10 is rotated in one direction. At the instance that the direction of rotation changes from one direction to the opposite direction, the time varying frequency difference tends toward zero.

Figure 4A:
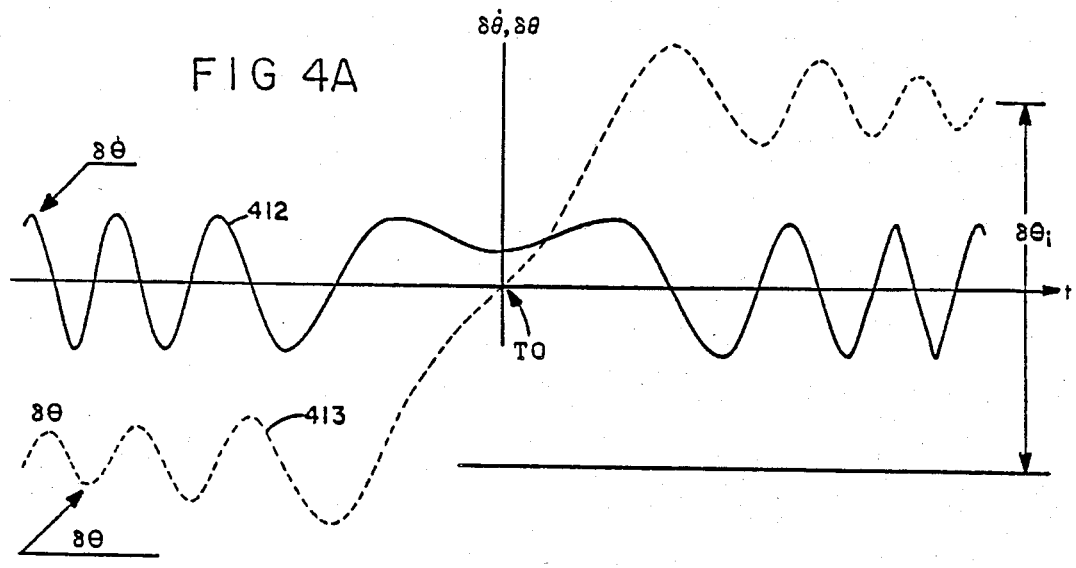
FIG. 4a is a graphical representation of lock-in error in a typical ring laser gyro output signal.

FIG. 4a graphically illustrates the error resulting from the relation described in equation (4) for a dithered gyro in the region of rotation direction reversal. Curve 412 plots the error in the gyro rate output $\delta\dot{\theta}$ against time, showing a decreasing frequency before the reversal occurring at time T0, and an increasing frequency thereafter. The essentially constant amplitude of curve 412 is dependent on the sensor's characteristic lock-in rate, $\Omega_L$. Curve 413 plots the error in the gyro angular output, $\delta\theta$, which is obtained by integrating curve 412. As shown, the gyro angular error is oscillating with varying frequency and amplitude before and after the change of direction, and exhibits a step through an incremental error angle $\delta\theta_i$ across the change of direction. As may be seen from FIG. 4a, the error resulting from equation (4) is always present, but has its most important effect when a change of direction occurs. For a periodic sinusoidal dithered ring laser gyro, such a change of direction occurs twice each dither cycle, and such an error as described on curve 413 occurs at each change of direction. Unfortunately, these lock-in errors are not necessarily equal in magnitude nor always opposite in sign in an ordinary biasing system of the prior art, leading to a build-up of error in the gyro output sometimes referred to as random drift or random walk.

The discussion presented just above and FIG. 4a was described for a mechanically dithered gyro. Nevertheless, the characteristics of a sensor optically or electrically dithered are similar to those already presented, and therefore will not be discussed in the following discussion.

Figure 4B:
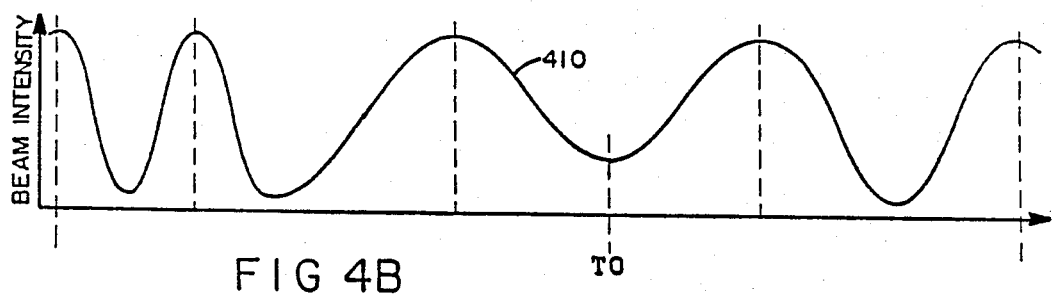
FIG. 4b is a graphical illustration representing the combined beam intensity presented to the detector about a direction reversal of a dithered gyro.
Figure 4C:
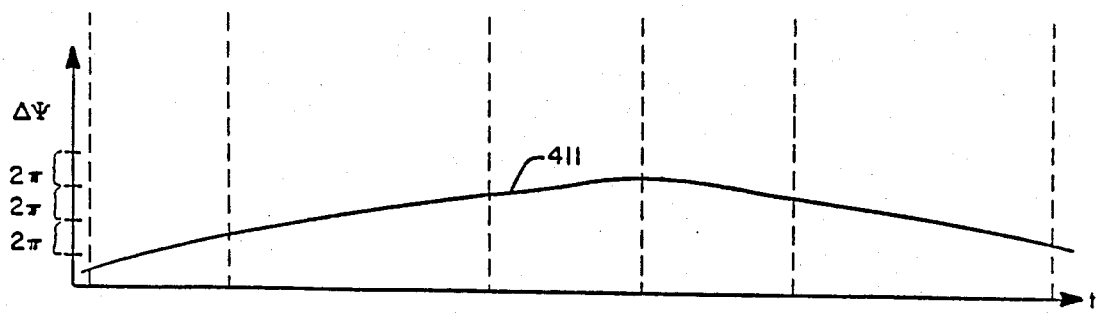
FIG. 4c is a graphical representation of the total phase shift change about a direction reversal of a dither gyro.

Curve 410 in FIG. 4b graphically illustrates the intensity of the combined beams 11' and 12' producing the interference pattern observed by, for example, photodetector 301 shown in FIG. 3a as well as the output electrical signal thereof about the instant of time T0 illustrated in FIG. 4a. As described earlier, curve 410 essentially indicates the instantaneous phase angle $\psi$ plus the measurement offset phase angle $\beta$. From curve 410, the change in instantaneous phase angle between the two counter-traveling beams can be obtained since the instantaneous phase angle thereof changes $2\pi$ radians between two successive intensity maximums or two successive intensity minimums as observed by photodetector 301. A plot of the total $\Delta\psi$, the change in gyro output angle about T0 is graphically illustrated in FIG. 4c, curve 411. Note that the rate of change of the instantaneous phase angle between the two counter-traveling beams gradually decreases until time T0, at which time the frequency difference reverses polarity and the mechanical rotation changes direction. At times greater than T0 the rate of change in $\psi$ increases until an instant of time is reached which corresponds to the maximum negative frequency difference.

At times about T0, instances of sign reversal of the frequency difference, the gyro input angular acceleration can be presumed to be essentially constant, and, therefore, the second derivative of $\psi$ is presumed to be substantially constant and is related by:

$$\ddot{\psi}_o = k\dot{\omega}_o \quad (5)$$

where:
$\dot{\omega}_o$ is the input angular acceleration resulting from the total motion applied to the sensor and includes dither motion, and
K is a proportionality constant or scale factor.

As will be described below, the incremental error angle $\delta\theta_i$ can be expressed as a function of the phase angle $\psi$ and the angular acceleration $\ddot{\psi}$ that exists at the instant that direction reverses, at which time the rate $\dot{\psi}$ is zero. Because of its importance to describing the error growth, the point of direction reversal, $\dot{\psi}$ being zero, will be called the zero rate crossing (ZRC), the instantaneous phase angle between the counter-traveling beams at the ZRC will be called the ZRC phase angle $\psi_o$, and the corresponding second time derivative of $\psi$ will be called the ZRC angular acceleration $\ddot{\psi}_o$.

The first assumption in the discussion which follows is that $\ddot{\psi}$ in the region of the ZRC is essentially constant. The second assumption is that the error can be described by events in the region of the ZRC and that the incremental angle error occurring at one ZRC is independent of all others. Based on the first assumption the following quadratic expression for $\psi$ may be obtained:

$$\psi = \psi_o + \frac{\ddot{\psi}_o(t - t_o)^2}{2} \quad (6)$$

where
t is time
$t_o$ is time at the ZRC
$\psi_o$ is the instantaneous phase angle as indicated by one of the photodetectors at the ZRC
$\ddot{\psi}_o$ is the second derivative of $\psi$ at the ZRC Making a change of variables on time, and substituting equation (6) into (4) yields:

$$\delta\dot{\theta} = -\Omega_L \sin[\psi_o + \beta + x^2(\text{sign}\ddot{\psi}_o)] \quad (7)$$

$$\text{where } x = (t - t_o)\sqrt{\frac{|\ddot{\psi}_o|}{2}}$$

Applying the second assumption described above, the incremental angle error from a single ZRC can be obtained by integrating equation (7) over all time. That is for the $i^{th}$ ZRC, $$\delta\theta_i = \int_{-\infty}^{+\infty} \delta\dot{\theta} dt \qquad (8)$$

To accomplish the integration indicated by equation (8), the Fresnal integral property of:

$$\int_0^\infty \sin x^2 dx = \int_0^\infty \cos x^2 dx = \sqrt{\frac{\pi}{8}} \qquad (9)$$

must be applied, yielding:

$$\delta\theta_i = \Omega_L \sqrt{\frac{\pi}{|\dot{\psi}_o|}} \{\sin(\psi_o + \beta) + \cos(\psi_o + \beta)[\text{sign}\dot{\psi}_o]\} \qquad (10)$$

Equation (10) describes the angular error increments $\delta\theta_i$ from a single passage through zero rotation rate during one-half of a dither angle. The incremental error, $\delta\theta_i$, is included in the output of first signal processing means 120, and accumulates in the output thereof. The sign of $\dot{\psi}_o$ is indicative of which half of the dither cycle the error is accumulated. Equation (10) can be rewritten keeping track of dither cycle polarity, and is presented in equations (11a) and (11b) which describe the incremental angular error from a single passage through zero rotation rate when $\dot{\psi}_o$ is positive and negative respectively.

$$\delta\theta_i^+ = C_1 \Delta F_1 + C_2 \Delta F_2 \qquad (11a)$$

$$\delta\theta_i^- = C_3 \Delta F_3 + C_4 \Delta F_4 \qquad (11b)$$

where $$C_1 = C_4 = -\sqrt{\pi}\, \Omega_L(\cos\beta + \sin\beta) \qquad (12a)$$

$$-C_2 = C_3 = \sqrt{\pi}\, \Omega_L(\cos\beta - \sin\beta) \qquad (12b)$$

and where $$\Delta F_1 = \frac{\cos\psi_o^+}{\sqrt{|\dot{\psi}_o^+|}} \qquad (13a)$$

$$\Delta F_2 = \frac{\sin\psi_o^+}{\sqrt{|\dot{\psi}_o^+|}} \qquad (13b)$$

$$\Delta F_3 = \frac{\cos\psi_o^-}{\sqrt{|\dot{\psi}_o^-|}} \qquad (13c)$$

$$\Delta F_4 = \frac{\sin\psi_o^-}{\sqrt{|\dot{\psi}_o^-|}} \qquad (13d)$$

with the symbols and organization of these equations arranged for exposition purposes which will be described below.

The superscript "+" indicates that the incremental angle error is described for the ZRC in which $\dot{\psi}_o$ is positive, and the superscript "−" indicates that the error is described for the ZRC in which $\dot{\psi}_o$ is negative.

Making the assumption that each laser gyro has an $\Omega_L$ and $\beta$ which are essentially constant, the coefficients $C_1$, $C_2$, $C_3$, and $C_4$ may also be regarded as essentially constant, and representing the characteristic signature of a particular laser gyro. Although the relation between $C_1$ and $C_4$ shown in equation (12a) and between $C_2$ and $C_3$ shown in equation (12b) are a consequence of the derivation, these coefficients are separately defined to allow differences that may exist between the "+" and "−" ZRC's.

Equations (11a) and (11b) quantitatively describe the incremental lock-in error in the gyro output angle typically found in prior art systems.

Equations (13a) through (13d) are defined as the incremental error parameters which contribute to the total lock-in error as expressed by the incremental lock-in error in equations (11a) and (11b). The coefficients in equations (12a) and (12b) are defined as the characteristic signature coefficients of a particular laser gyro. The contribution of lock-in error accumulated in the gyro output of first signal processing means 120 occurs during each half dither cycle and is related to a trigonometric function of the value of the instantaneous phase angle between the counter-traveling beams, $\psi$, occurring at each sign reversal of the frequency difference between the two counter-traveling beams multiplied by the appropriate characteristic signature coefficients as indicated by equations (11a) through (12b).

Hereafter, the value of the relative instantaneous phase angle between the counter-traveling beams, $\psi$, which occurs at the instant when $\dot{\psi}$ is zero is designated as the Zero Rate Crossing (ZRC) phase angle, $\psi_o$.

It is important to note that the zero rate crossing is responsive to, and dependent upon the total rotational motion about the gyro input axis, and includes both inertial space rotation and dither motion. Although the discussion so far presented and the discussion which follows utilizes a mechanical dither, an electrical biasing means, as indicated above, has also a corresponding ZRC phase angle which occurs at substantially the instant of time when the frequency difference between the counter-traveling beams changes sign. Thus, a similar set of mathematical expressions, like those of (11a) and (11b), can be generated which involve the corresponding ZRC phase angle in these situations and one or more characteristic signature coefficients from which the contribution of error due to lock-in can be determined.

Having quantified the incremental lock-in error generated in each dither cycle, a continuously corrected output angle may be generated using the ordinary gyro output angle modified by the total or accumulated lock-in error contained therein, and is expressed in equation 14:

$$\theta_c = \tilde{\theta} - \sum_{j=1}^m (\delta\theta_{ij}^+ + \delta\theta_{ij}^-) \qquad (14)$$

$$\theta_c = \tilde{\theta} - \Sigma C_i F_i$$

In the example presented, i = 1, 2, 3, and 4. Further, $$F_i = \sum_{j=1}^m \Delta F_{ij} \qquad (15)$$

where the $F_i$'s in equation (15) are obtained by summing the $\Delta F_{ij}$'s for each of the ZRC's that occur during the collection interval of $\tilde{\theta}$, where $\tilde{\theta}$ is the measured gyro output, which is the detected integral of rate, and $\theta_c$ is the gyro output after correction for lock-in. The $\Delta F_{ij}$'s and $C_i$'s are defined by equations (12) and (13) respectively.

The $F_i$'s expressed in equation 15 are defined as the lock-in error parameters, each being related to the summation of the incremental error parameters and accumulate with each passing ZRC in a manner corresponding to the accumulation of lock-in error in the gyro output angle, namely, the output of first signal processing means 120.

It is important to distinguish between $\theta_c$ and $\overline{\theta}$. $\overline{\theta}$ is determined from the beating of the two counter-traveling beams indicated by the interference pattern on surface 206 as described with reference to FIG. 2, and indicated at output of first signal processing means 120 in FIG. 1. The output signal on connecting means 121 represents $\overline{\theta}$. The interference pattern created and the rate of change thereof includes the lock-in error. Correction of the measured value, $\overline{\theta}$, is accomplished in the present invention by ascertaining the value of the instantaneous phase angle between the two counter-traveling beams at the instant of sign reversal of the frequency difference corresponding to $\dot\psi$ being zero—the instant of $\dot\psi$ being zero resulting from rotation provided by bias and inertial input rotation—and ascertaining the values of the characteristic signature coefficients $C_1$, $C_2$, $C_3$, and $C_4$, (hereafter referred to only as coefficients), which are a function of $\Omega_L$ and $\beta$ as indicated by equations (12a) and (12b). The corrected gyro output $\theta_c$ is indicated in FIG. 1 at the output of fourth signal processing means 160 at output 161.

Since each ring laser gyro will have different light scattering characteristics which contribute mostly to the lock-in phenomenon, the characteristic signature coefficients represent the characteristic signature of a particular ring laser gyro and biasing system. Thus, the coefficients must be determined empirically for each gyro for the best error correction scheme. Although an estimate of the coefficients based on long term data collection or the like would also work in theory, an estimate would not provide the most precise of the two methods for obtaining lock-in error, and lock-in error correction.

Error correction in the present invention is obtained by (i) a means for determining the ZRC phase angle and the second derivative thereof; (ii) a means for determining incremental error parameters, namely, summing trigonometric functions of each ZRC phase angle; and (iii) a means for characterizing the sensor, namely, empirically determining the characteristic signature coefficients based on a series of measurements of gyro output angle and ZRC phase angle, and performing a linear regression or similar estimation processes and the like for determining the coefficients.

Note, in order to obtain useful coefficients characterizing the sensor, the sensor must be perturbed in a manner which will cause distinguishing characteristics in the lock-in error parameters, allowing separation of the coefficients during the regression process.

Examples of sensor perturbation include random noise in the dither, controlled input base motions such as ramping, or the like.

In the embodiment of the invention shown in FIG. 1, second signal processing means receives electrical signals from transducer 110 through connecting means 112 as indicated earlier. Second signal processing means requires electric signals which are indicative of the instantaneous phase angle between the two counter-traveling beams and can be obtained by way of example from the interference pattern closed on the surface 206. Photodetectors 301 and 302 provide electrical signals which satisfy the requirement of providing phase information to second signal processing means, 140.

Second signal processing means 140 responds to electrical signals representative of the instantaneous phase angle between the counter-traveling beams and (i) determines the instantaneous phase angle relative to some fixed spatial reference (measurement offset, $\beta$) at the instant of sign reversal of the frequency difference (i.e. direction reversal), $\psi_o$, and the value of $\ddot\psi_o$; (ii) determines the sign direction of the frequency difference or the sign of $\dot\psi$; and (iii) generates the sine and cosine values of the zero rate crossing phase angle, $\psi_o$. Second signal processing means, 140, in combination with electrical signals from transducer 110, indicative of the behavior of the counter-traveling beams, provides the incremental error parameters which are a function of the lock-in error or light scattering errors, information of which is contained in the characteristic behavior of the counter-traveling beams, and determines lock-in error parameter and signals indicative thereof for subsequent signal processing.

FIG. 5 is a general block diagram describing the functions of second signal processing means 140 of FIG. 1. Referring to FIG. 1 and FIG. 5, second signal processing means, 140, receives signals from transducer 110 through connecting means 112. Electrical signals on connecting means 112, as indicated earlier, are representative of the instantaneous phase difference between the two counter-traveling beams. By way of example, the electrical signals may be the output of two photodetectors 301 and 302 as shown in FIG. 3a. These signals are monitored by direction indicator 501 which provides a signal indicative of the sign direction of $\dot\psi$. A zero rate crossing (ZRC) phase angle detection means, 502, coupled to direction indicator 501, provides a signal at approximately the instant of direction change indicated by direction indicator 501. A ZRC phase angle measurement means 503 is coupled to ZRC detection means 502 and connecting means 112 for obtaining a measurement of the ZRC phase angle and corresponding second derivative derived from signals on connecting means 112 from transducer 110. The output of the zero rate crossing phase angle measurement means, 503, is coupled to a sine-cosine value generator 504 which provides output signals representative of the sine and cosine value of each ZRC phase angle. These signals are presented to a calculator 505 for determining the incremental error parameters indicated by equations (13a) through (13b). In turn, the incremental error parameters are presented to storage and summing means 506 through connecting means, 510. Storage and summing means 506 keeps a continuous record of the sum of incremental error parameters and provide the sums thereof, being the lock-in error parameters indicated by equation (15). The lock-in error parameter signals are presented to third signal processing means, 150, through connecting means 141. These signals are utilized for generating the sensor characterisitic signature coefficients.

Third signal processing means 150 generates the signature coefficients based on known rotation rates which the gyro is subjected to, and lock-in error parameters provided by the summing and storage means 506 of the second signal processing means 140. A detailed explanation of third signal processing means 150 follows.

The lock-in error parameters signals provided by storage and summing means 505, being trigonometric functions of the ZRC phase angle, and the coefficients provided by third signal processing means 150 are combined in fourth signal processing means, 160 with the output angle provided by first signal processing means 120 for providing a signal corresponding to the corrected gyro output angle according to equation (14).

A detailed description of second, third, fourth, and fifth signal processing means will now be described.

Figure 8:
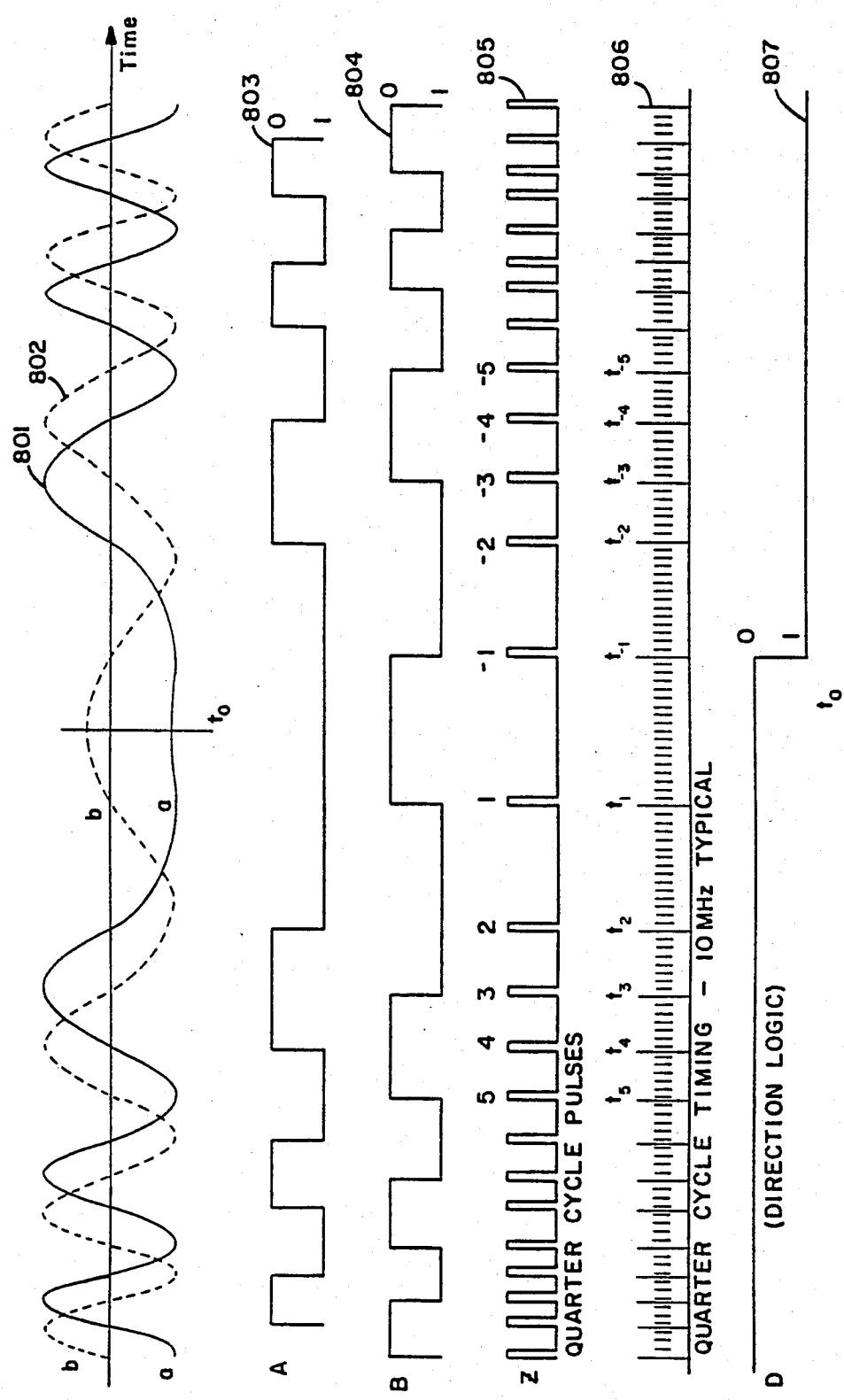
FIG. 8 is a timing diagram illustrating the signals of the systems shown in FIG. 6 and FIG. 7.

Consider the output of detectors 301 and 302 being represented by signals "a" and "b", these outputs being graphically illustrated in FIG. 8 by curves 801 and 802. The ZRC phase angle and direction can be obtained from information supplied by either of or both photodetectors 301 and 302. With photodetectors 301 and 302 separated by one-quarter of a fringe spacing of the interference pattern generated on surface 206, the output signals of photodetectors 301 and 302 will be in phase quadrature. Arbitrarily designating the output of photodetector 301 as "a" and the output of photodetector 302 as "b", an expression for their outputs can be represented by:

$$a = \sin(\psi) \tag{16}$$

$$b = \sin(\psi + \beta + \phi) = \cos(\psi + \phi) \tag{17}$$

where $\beta = 90°$ where $\psi$ is the instantaneous phase angle between the counter-traveling beams offset by $\beta$ defined above, and $\phi$ being error in the orthogonality ($\frac{1}{4}$ of a fringe) established by the physical positioning of the photodiodes. In the detection system exemplified by equations (16) and (17), the zero reference occurs when signal (a) is zero and signal "b" is positive. The value of $\phi$ is attributed to the alignment spacing error of separating the photodetectors 301 and 302 by exactly one-quarter of a fringe spacing.

One approach to obtain $\psi$ at the ZRC instant, the point at which $\psi$ equals zero, is to measure the times between sign changes of the "a" and "b" signals and employ the approximation that $\dot{\psi}$ is nearly constant in the region of ZRC. By knowing the elapsed time between when, for example, "a" is zero and going positive, and when "b" is zero, for each of several sign changes of "a" and "b", a determination of the value of ZRC phase angle, $\psi_o$, can be made.

Figure 6:
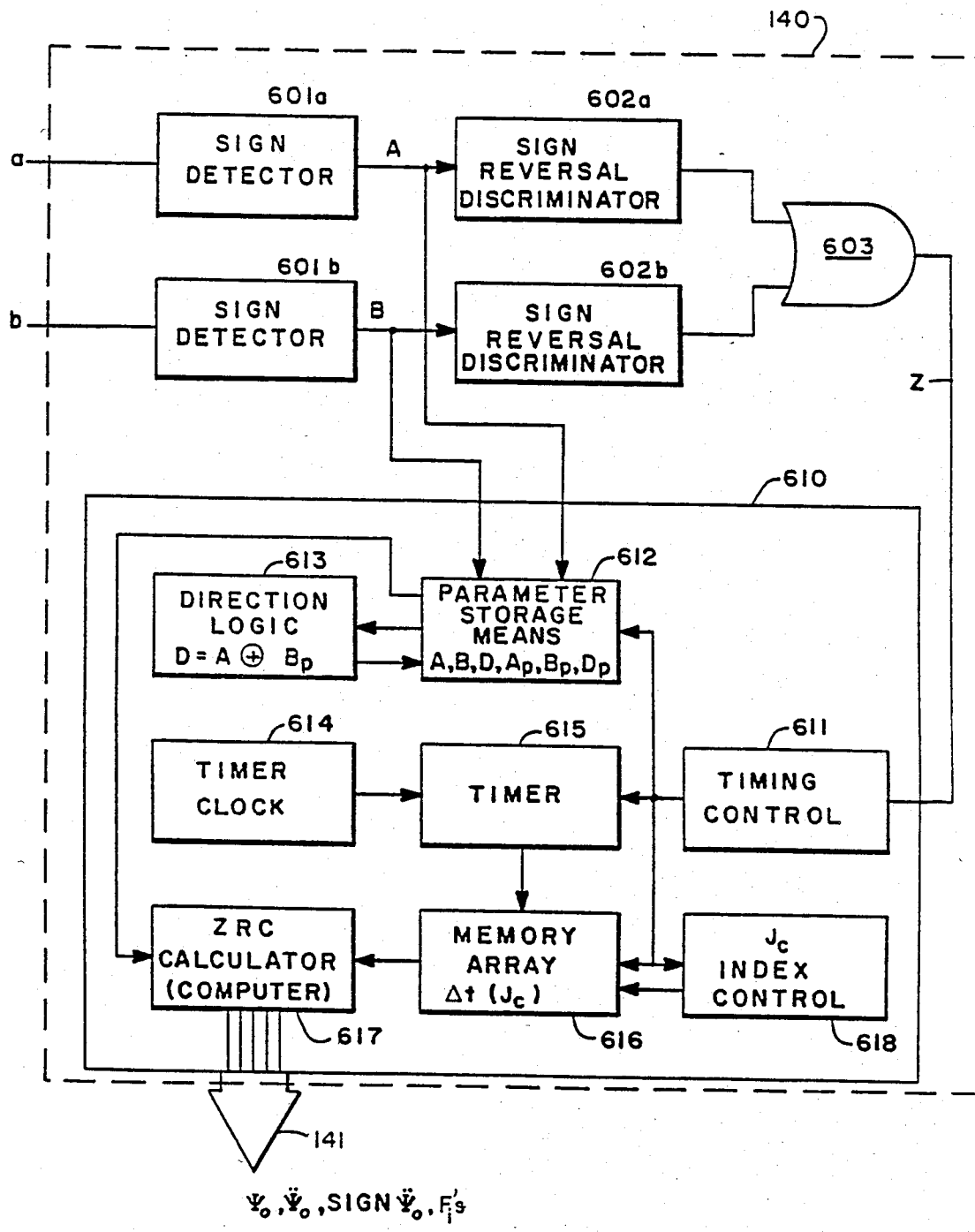
FIG. 6 is a block diagram showing further details of FIG. 5.
Figures 7A, 7B:
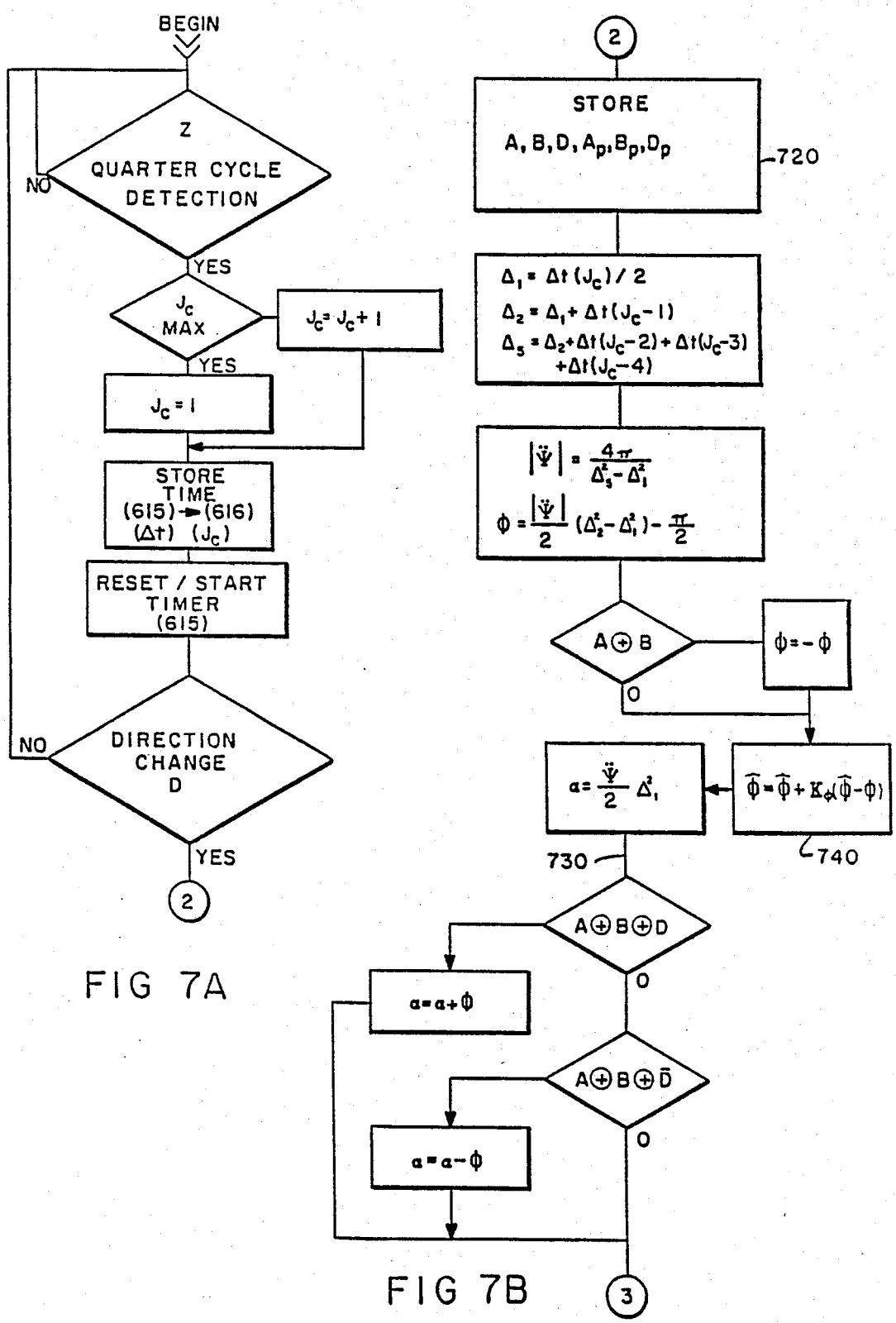

A more detailed showing of the block diagram of FIG. 5 describing second signal processing means 140 is shown in FIG. 6 and corresponding flow diagrams shown in FIGS. 7a-c. The primary purpose of the second signal processing means is to determine the lock-in error parameters based on the value of the ZRC phase angle. Referring now to FIG. 6, the output of photodetectors 301 and 302 represented by "a" and "b" are passed through sign detectors 601a and 601b respectively. The output of the sign detectors is a digital representation of the polarity of the input signals "a" and "b", where a high voltage level represents a logical zero corresponding to a positive polarity of the input signal, and a low voltage level represents a logical one corresponding to a negative polarity of the input signal. The output of sign detectors 601a and 601b are A and B respectively, becoming the digital representation of the polarity of input signals "a" and "b" respectively. The output of sign detectors 601a and 601b are individually passed through sign reversal discriminator blocks 602a and 602b respectively, each having as outputs a pulse, of small width, each time the input signals A and B respectively change polarity. The output of sign reversal discriminator 602a and the output of sign reversal discriminator 602b are inputs to an OR circuit 603, the output of which is designated Z. In the presence of rotation about the gyro input axis, the output of OR circuit 603 is a series of pulses representing a change in polarity of either input signal "a" or input signal "b". The output signal Z becomes a quarter cycle timing generator as will be further explained.

Sign detectors 601a and 601b, and sign reversal discriminators 602a and 602b can be constructed in a variety of ways made up of simple signal comparators, pulse edge discriminators, pulse shapers, and the like, and therefore are not described herein.

Shown in FIG. 8 is a graphical representation of the input signals "a" and "b" indicated by curves 801 and 802 respectively, the output of sign detectors 601a and 601b shown as signals A and B respectively by curves 803 and 804 respectively prior to, and just after, a sign reversal of $\psi$ or ZRC at time T0. Curve 805, shown in FIG. 8, is a graphical representation of the quarter cycle output pulses, Z, of OR-gate 603 providing pulses at each occurrence of a change in state in either of signals A or B corresponding to a change in polarity of input signals "a" and "b" respectively. The numbers just above curve 805 are reference numerals for designating quarter cycle time events of signals "a" and "b". Also indicated in FIG. 8 is the instant of time T0 where a $\psi$ sign reversal occurs, which is the ZRC instant of time. This will be explained in detail below.

For purposes of discussion, time to the left of T0 in FIG. 8 corresponds to the situation where $\psi$ is positive and $\dot{\psi}$ is negative. As indicated earlier with reference to FIGS. 3a and 3b, a full cycle of either signal "a" or "b" corresponds to a phase change of $2\pi$ radians between the two counter-traveling beams, a half-cycle corresponding to a phase angle change of $\pi$ radians. Assuming, for this discussion, that the value of $\phi$, the orthogonality constant, is zero, the time elapsed between the event of A changing logic state and then B changing logic state, or vice versa corresponds to a phase angle change between the counter-traveling beams of $\pi/2$ radians. Defining the time period elapsed between known changes in state of A and B as phase angle quadrants, information supplied by signals A and B, and the quarter cycle pulses, Z, can be utilized to determine the ZRC phase angle at time T0.

The ZRC phase angle may be represented by a number, of $\pi/2$ quadrants plus an angle $\alpha$ where $\alpha$ is defined to be the amount of phase change in the last quadrant entered before the sign of $\dot{\psi}$ changes. For the example indicated in FIG. 8 on curves 801 and 802, the last quadrant occurs after point "1" where signal "b", curve 802, has a zero value and is rising.

Assuming, as indicated earlier, that $\dot{\psi}$ at the ZRC crossing is substantially constant, and utilizing the mathematical expression for $\psi$ expressed in equation (6), the unknown angle $\alpha$ and the value of $\dot{\psi}_o$ can be determined in terms of elapsed time between changes of state between signals A and B.

Defining j, by timing reference points as indicated above curve 805, and $t_j$ as the time of the change of state of either A or B as indicated above curve 806, the following mathematical expression relating $\alpha$ to the elapsed time and $\dot{\psi}$ can be written $$\alpha + (j-1)\frac{\pi}{2} = \frac{|\ddot{\psi}_o|}{2}(\Delta_j)^2 \text{ for } j = 1, 2, 3, \ldots \quad (18)$$

where: $\Delta_j = t_o - t_j$, and $$t_o = \frac{t_1 + t_{-1}}{2}$$

This employs the approximation that $t_o$ is at the midpoint between the change of state of either A or B immediately before the change of direction and the corresponding change of state immediately after the reversal. Equation 18 can be solved in terms of quarter cycle times called $\Delta t_j$, which are based on counting a high frequency clock between quarter cycle pulses as shown on curve 806. These are defined as $$\Delta t_j = t_{j-1} - t_j, \text{ and } \Delta t_1 = \frac{1}{2}(t_{-1} - t_1)$$
$$\text{for which } \Delta_j = \sum_{i=1}^{j} \Delta t_i$$

satisfying the requirement of equation 18. By knowing a sequence of $\Delta t_j$'s simultaneous equations formed from equation (18) can be used to solve for $\ddot{\psi}_o$ and $\alpha$. By knowing the polarity of $\psi$ and the polarity of signals "a" and "b" derived from the logical signals A and B, and using the trigonometric cosine and sine relationships, the value for cosine $\psi$ and sine $\psi$ can be determined for each ZRC phase angle.

Equation (19) below is a modification of equation 18 which includes the orthogonality constant, $\phi$. Three simultaneous equations can be produced from known time values between the A and B zero crossing points to solve for $\alpha$, $\ddot{\psi}_o$ and $\phi$. From the logical signals A and B derived from signals "a" and "b" the polarity of $\psi$ can be determined and the ZRC quadrant can be identified. This information can be used to calculate $\psi_o$ in terms of $\alpha$.

The polarity of $\psi$ can be defined by the logical expression $$D = A \oplus Bp \begin{pmatrix} 0 \text{ positive } \psi \\ 1 \text{ negative } \psi \end{pmatrix}$$

where Bp is the logical state of B before the most recent change of state of either A or B.

$$\alpha \pm \lambda_j\phi + (j-1)\frac{\pi}{2} = \frac{|\ddot{\psi}|}{2}\Delta_j^2 \text{ for } j = 1, 2, 3, \ldots \quad (19)$$

The value of $\lambda_j$ in equation (19) times $\phi$ is zero whenever:

$A \oplus B \oplus D = 0$ and $j$ is odd, or $A \oplus B \oplus D = 1$ and $j$ is even.

Otherwise $\lambda_j$ is "1" having the sign value being positive when $\psi$ is positive, and negative when $\psi$ is negative.

The above discussion shows just one technique for obtaining the value of $\ddot{\psi}$ and $\ddot{\psi}_o$, and ultimately producing values of the sine and cosine function of the angle $\psi$ at the zero rate crossing, namely, when $\psi$ is zero. Many other approaches are, of course, possible using the measurements of $\Delta t$ between events occurring and indicated by the output of either of photodetectors 301 or 302.

One example of another technique for obtaining the value of $\ddot{\psi}_o$ and $\ddot{\psi}_o$ is the use of half-cycle times. That is, making time measurements between successive positive going and negative going zero crossings of the output signal provided by one of the photodetectors which can, of course, be determined by looking at changes of state of either of the logical outputs A and B. An expression similar to equation (19) can be generated, a new set of simultaneous equations can be written. Similarly, $\ddot{\psi}_o$ and $\ddot{\psi}_o$ can be determined by making time measurements between whole cycle times.

Again referring to FIG. 6, the output signals A and B and Z are presented to signal processing means 610. Signal processing means 610 includes a timing control, 611, parameter storage means, 612, direction logic means, 613, timer clock 614, timer 615, memory array 616, index control 618, and ZRC calculator (computer) 617. Each of these elements are well known in the art, and can be found in any general purpose computer including the variety of computers known as microprocessor or microcomputers.

Parameter storage means, 612, stores the values of A and B, the prior values of A and B defined as Ap and Bp, before the last received quarter cycle pulse, Z, the logical representation of the polarity of $\psi$ indicated by D, and the previous values of D, defined as Dp, before the last quarter cycle pulse. The values of D and Dp are provided by direction logic block 613 having the logical expression indicated above. The information stored in parameter storage means 612 is utilized for ZRC phase angle determination in connection with ZRC calculator 617.

Signal processing means 610 includes a timing control, 611, which is primarily controlled by the output of pulses from OR-gate 603, the quarter cycle timing. Timing control signal 611 essentially synchronizes the storage parameters A, B and D before and after the quarter cycle pulse. Timing control, 611 also synchronizes timer, 615, which times or counts timer clock pulses provided by timer clock, 614. Timer clock pulses are indicated by pulses 806 in FIG. 8. Timer 615 counts the number of clock pulses between quarter cycle pulses, Z, indicated by pulses 805 in FIG. 8. The purpose of timer clock 614 and timer 615 is to determine the real time between quarter cycle pulses. The output of timer 615 is a digital representation of the real time between quarter cycle pulses and is successively stored after each quarter cycle pulse in memory array 616. Memory array, 616, stores the real time values between quarter cycle pulses and stores them in a matrix or array location identified by the index term "Jc" provided by index control 618 as is indicated in FIGS. 6 and 8. The memory array is under control of timing control 611 so that the index Jc is incremented for each quarter cycle pulse.

As indicated earlier, having the times between quarter cycle pulses, and detecting the occurrence of direction change, D, the value of the ZRC phase angle and the value of $\ddot{\psi}$ can be determined as already indicated.

Curve 806 represents the output of timer clock 614 for timer 615 having a value of 10 megahertz. It is assumed in the discussion which follows relative to the flow diagrams shown in FIG. 7 that the dither frequency is relatively slow compared with the ZRC calculator cycle times for computation. Of course, many variations of the value of timer clock 614 may be utilized with more or less greater accuracy for the ZRC phase angle determination.

ZRC calculator 617, in FIG. 6, is essentially a computer or microprocesser programmed for solving the simultaneous equations for determining a solution of equation (19) for $\alpha$, $\phi$, and $\dot{\psi}$. The flow diagram shown in FIG. 7a begins by noting a quarter cycle detection signal provided by the output Z. The index, Jc is incremented by one and the time between the last quarter cycle pulse and the current one is stored in the appropriate indexed array, and the timer is reset. At this point in the flow diagram the direction parameters D and Dp are examined to determine if a direction change has occurred, namely the ZRC crossing. If not, the cycle repeats. If a direction change is indicated, the ZRC calculation process begins as noted in the flow diagram shown in FIG. 7b.

At the beginning of the ZRC phase angle calculation indicated by the routine shown in the flow diagram of FIG. 7b, the values of A, B, $A_p$, $B_p$, D and $D_p$ are stored as indicated by block 720. Note that when the ZRC routine is entered, the values of $A_p$, $B_p$, and $D_p$ are those values which correspond to the phase angle quadrant prior to the direction or polarity change of $\psi$, and A, B, and D correspond to those values after the direction changed, that is after the zero rate crossing—$\dot{\psi}$ being zero.

The ZRC routine process continues in FIGS. 7a and 7b by calculating the individual values of $\Delta_j$ for J=1, 2 and 5, and are subsequently utilized for calculation of $\phi$, $\dot{\psi}_o$, and $\ddot{\psi}_o$. Note that other values could have been chosen except for J=1 for determining a different set of simultaneous equations. Using these values of $\Delta_j$, a set of simultaneous equations can be generated for the solution of equation (19) as shown below.

$$\ddot{\psi} = \frac{4\pi}{\Delta_5^2 - \Delta_1^2}, \alpha = \frac{|\ddot{\psi}|}{2} \Delta_1^2$$

$$\phi = \frac{|\ddot{\psi}|}{2}(\Delta_2^2 - \Delta_1^2) - \frac{\pi}{2} \tag{20}$$

Using the stored parameters in block 720, the sign of $\phi$ is determined for modifying the value of the $\alpha$ angle calculated. Once $\alpha$ is determined at point 730 in the flow diagram, the sine of $\psi$ and cosine of $\psi$ is determined by the routine shown in the flow diagram of FIG. 7c. The ZRC calculator 617 of FIG. 6 includes the sine and cosine function generator for determining the sine of $\alpha$ and the cosine of $\alpha$. Because of the trigonometric relationships between the signals "a" and "b", the logical states of outputs A and B can be utilized for determining the sine of $\psi_o$ and the cosine of $\psi_o$ from well known trigonometric identities as indicated in the flow diagram shown in FIG. 7c. These values, in turn, are divided by the square root of the absolute value of $\dot{\psi}_o$ just determined in accordance with equations (13a-d), and further processed in accordance with equation 15 in flow diagram blocks 505' and 506' respectively in FIG. 7c, corresponding to blocks 505 and 506 in FIG. 5. The output data of ZRC calculator 617 being that already indicated at the output means 141 of second signal processing means 140.

Although not indicated, the general manipulation of the array index Jc as well as initializations of the storage and summing means 506 are not shown but procedures for such are well known in the art.

Since 100 is an orthogonality constant between detectors 301 and 302, $\phi$ generated by the solution of the simultaneous equations should always be equal, however there is always some error in such a process. Indicated in the flow diagram of FIG. 7b by block 704 is a digital filter for obtaining an average value of $\phi$ having the form:

$$\hat{\phi} = \hat{\phi} + K_\phi(\hat{\phi} - \phi)$$

where $\phi$ is the currently calculated value;
$\hat{\phi}$ is the filtered value; and
$K_\phi$ is the filter gain.

Thus, one example for providing a determination of the ZRC phase angle at each ZRC crossing has been described and also a method for obtaining the sum of the sines and cosines of the ZRC phase angle each divided by the appropriate value of $\phi$ for the individual ZRC instant for each direction has also been described.

As indicated by FIG. 1, the third signal processing means 150 receives data from the output of the first signal processing means 120 which provides gyro output data uncorrected for lock-in through connecting means 121. Third signal processing means 150 also receives data from the second signal processing means 140 through connecting means 141, the data being lock-in error parameters F1, F2, F3 and F4. The data provided by second signal processing means 140 is a continuous record of the sum of the incremental error parameters being functions of the sines and cosines of the ZRC phase angle for each direction of rotation of the ring laser gyro, the sums being already defined as lock-in error parameters indicated by equations (15) and (13). The function of third signal processing means 150 is to combine the raw gyro output data from the first signal processing means 120 and the lock-in error parameters from second signal processing means 140 to provide the characteristic signature coefficients already described, and signals indicative thereof at the output means 151 of the third signal processing means 150. Third signal processing means can be any computational device capable of performing a linear regression in order to establish the coefficients C1, C2, C3, and C4 for a solution to equation (14). Once the coefficients are determined, the gyro output provided by first signal processing means 120 can be corrected by continuous knowledge of the lock-in error parameters F1, F2, F3, and F4 in accordance with equation (14) recorded again here in somewhat different form:

$$\theta_c = \overline{\theta} - C_1F_1 - C_2F_2 - C_3F_3 - C_4F_4 \tag{21}$$

One type of linear regression solution to establish empirically the coefficients indicated by equations (12a) and (12b) is the well known least squares fit of a polynomial based on known parameters to generate a set of coefficients. As indicated by equations (11a) and (11b) there are four coefficients to be determined, namely, C1, C2, C3, and C4.

The inputs required by third signal processing means 150 to perform its functions as discussed are (i) uncorrected gyro output data, (ii) the lock-in error parameters, and (iii) some known values or known functions of angular rotation. The latter term provides the lefthand side of equation (21) in order to derive a polynomial indicative of a characteristic signature of the ring laser gyro. Knowledge of angular rotation required by third signal processing means 150 may consist of information gained from an external reference such as another gyro or an angular rate measuring test device. Alternatively, the knowledge may be simply that the angular rate is constant, such as knowing that ring laser gyro 100 is not rotating relative to the earth.

Having the three kinds of information required by third signal processing means 150 indicated above, the ring laser gyro may be monitored for several seconds or several hours providing discreet input information into the third signal processing means and generating the characteristic signature coefficients. Once the coefficients have been established, the characteristic signature of the ring laser gyro being so characterized, the system may be continuously operated utilizing the coefficients generated by the third signal processing means 150 and the continuously supplied lock-in error parameters generated by second signal processing means 140 as will be now explained.

Again, referring to FIG. 1, there shown is a fourth signal processing means, 160 having as inputs: (i) uncorrected gyro output data provided by first signal processing means 120 through connecting means 122; (ii) lock-in error parameter signals F1, F2, F3, and F4, provided by second signal processing means 140 through connecting means 142; and (iii) the characteristic signature coefficients provided by third signal processing means 150 through connecting means 151. The fourth signal processing means provides the computation indicated by equation (21) and corresponding equation (14) and provides a corrected gyro output signal at the output thereof which is a function of the uncorrected gyro output provided by the first signal processing means 120, the lock-in error parameter signals provided by the second signal processing means 140, and the pre-established characteristic signature coefficients provided by the fourth signal processing means 150. Thus, the output of the fourth signal processing means, 160, is the corrected gyro output taking into account the errors introduced by lock-in or other light scattering errors which are part of laser gyro system 100 as shown in FIG. 1.

The signal processing means, 120, 140, 150, and 160, although indicated in FIG. 1 as separate signal processing means, may be combined into a single signal processing means such as a general purpose computer, or a microprocessor, or the like. Obviously, many modifications and variations of the present invention are possible in light of the above teachings. Although use of the ZRC phase angle is shown, a different choice is possible in accordance with equation (4), such as $\psi$ at $\psi$ being a maximum. Further, there are many possible ways of using the outputs of either one or both of photodetectors 301 or 302 to obtain information representative of ZRC phase angle utilizing a digital timing scheme as indicated above or may also be provided by utilizing analog circuitry for monitoring the output signals of photodetectors 301 and 302. Thus, techniques for obtaining ZRC phase angle information is a matter of choice.

The flow diagrams presented in FIG. 7 are presented as an example of a scheme which may be written in common programming language for either a general purpose computer or microprocessor as is well known in the art.

The ring laser gyro system presented above with reference to FIGS. 1 thru 8 makes use of the zero rate crossing phase angle, $\psi$ occurring at each turnaround indicated by $\psi$ being zero, to generate one or more incremental error parameters and one or more lock-in error parameters which are used for a determination of the accumulated error in the gyro output angle. These error parameters, when multiplied by a set of coefficients which characterize the laser gryo from which the error parameters were obtained and combined with the uncorrected gyro output angle data derived from the counter-traveling beams provide a compensated or corrected gyro output angle substantially corrected for lock-in errors. Continuous updating of the error parameters in combination with the coefficients representing the characteristic signature of the laser gyro provide a means from which the gyro output signal can be corrected for the error between the true gyro input angle and the uncorrected gyro output obtained. A correlary of this is that if the error parameters are zero the characteristic coefficients have no importance, and furthermore, no correction of the gyro output signal would be required. This correlary is easily seen by analysis of equation (14) and equation (21).

Figure 9:
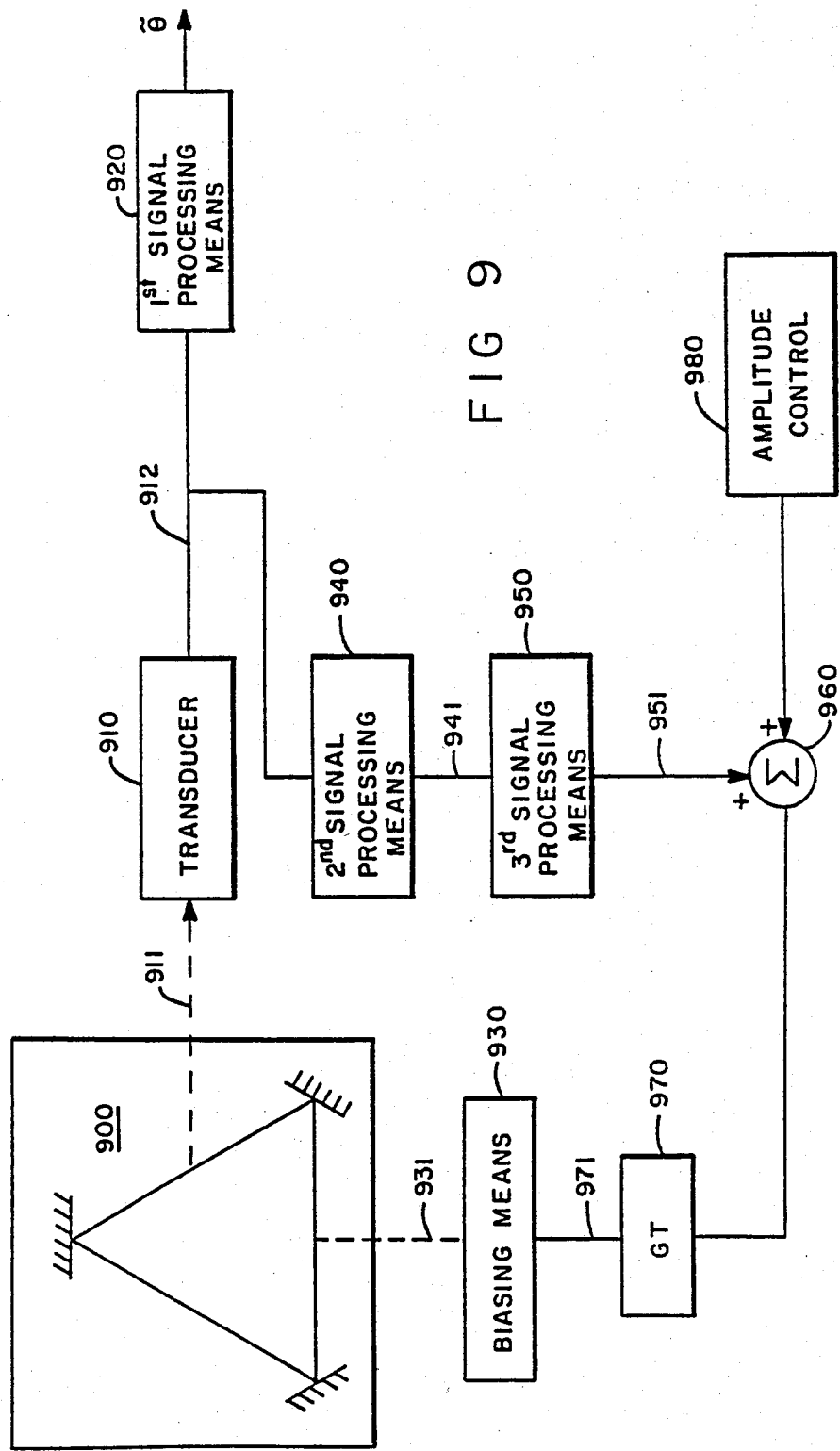
FIG. 9 is a block diagram showing another embodiment of the present invention using feedback dither control.

A ring laser gyro system operating in accordance with the above correlary is shown in block diagram form in FIG. 9. The system shown in FIG. 9 is somewhat similar to the system shown in FIG. 1 with the addition of a feedback biasing system arrangement which, as will be explained below controls the bias applied to the ring laser for ultimate control of the error parameters in a manner so as to drive the error parameters toward zero.

Referring now to FIG. 9, a transducer 910 is coupled to ring laser gyro 900 through coupling means 911 for providing electrical signals indicative of the behavior of at least one of the counter-traveling beams within ring laser gyro 900. A first signal processing means 920 is responsive to electrical signals provided by transducer 910 through connecting means 912. The first signal processing means 920, transducer, 910, and ring laser gyro, 900 perform the same functions and provide substantially the same signals as corresponding blocks 120, 110, and 100 respectively in FIG. 1. Ring laser gyro 900, like ring laser gyro 100 in FIG. 1, is coupled to a biasing means 930 similar to biasing means 130 except that biasing means 930 is responsive to an external control signal 971. Biasing means 930 is coupled to ring laser gyro 900 through coupling means 931. First signal processing means 920, similar to first signal processing means 120 in FIG. 1, produces the gyro output angle signal which is derived from the electrical signals provided by transducer 910 and is uncorrected for any light scattering errors such as lock-in. As will be shown, the ring laser gyro system shown in FIG. 9 provides a gyro output angle from first signal processing means 920 which contains a minimal amount of lock-in error therewith, substantially less than that contained in the output signal of first signal processing means 120 in FIG. 1.

In FIG. 9, a feedback biasing system arrangement is shown comprised of second and third signal processing means, 940 and 950 respectively, responsive to signals from the output of transducer 910 also through coupling means 912 to provide a bias control signal for biasing means 930. The bias control signal provided by third signal processing means 950 is summed by summing means 960 with a constant input signal provided by amplitude control 980. The output of summing means 960 is amplified by a gain block, 970, having a gain GT. The output of gain block 970 is designated by numeral 971 and presented to biasing means 930 for control of the bias introduced into the counter-traveling beams of ring laser gyro 900. This feedback system arrangement controls the bias applied to ring laser gyro 900 for affecting the counter-traveling waves in such a manner so as to drive the lock-in error normally included in the gyro output angle toward zero. Thus, the output angle provided by first signal processing means 920 need not be corrected for any error such as that included in the output of the first signal processing means 120 in FIG. 1 due to the normal buildup of error in dithered gyros as is typical in prior art systems.

Second signal processing means 940 is similar to second signal processing means 140 and the corresponding description with reference to FIGS. 5, 6, 7, and 8. Similar to FIG. 5, the second signal processing means 940 responds to electrical signals from transducer 910 provided on connecting means 912. Second signal processing means 940, like the second signal processing means 140 in FIG. 1, and described with reference to FIG. 5, generates lock-in error parameter signals derived from ZRC phase angle information. The output signals produced by second signal processing means 940 are: (i) a signal indicative of the polarity of $\psi$ corresponding to polarity of the frequency difference between the two counter-traveling beams; (ii) a signal indicative of a change in polarity of $\psi$, the signal being some sort of pulse or logic level change; (iii) a signal indicative of the ZRC phase angle occurring at the instant of polarity change of the frequency difference between the two counter-traveling beams, i.e. $\dot{\psi}$ equals zero; and (iv) lock-in error parameter signals being defined by equations (15) and (13) which are functions of the accumulation of the sine and cosine function values of the ZRC phase angle for each polarity of $\dot{\psi}$.

The output signals provided by second signal processing means 940 as indicated in (i) through (iv) just presented are presented to third signal processing means 950 through connecting means 941.

Third signal processing means 950 responds to the signals provided by second signal processing means 940, and in particular to the lock-in error parameter signals F1, F2, F3, and F4 per equation 15 and corresponding equation (13). Third signal processing means 950 operates on the lock-in error parameter signals and provides a control signal for controlling biasing means 930. The output of third signal processing means is added to a constant value signal provided by amplitude control 980 and the resultant signal is amplified by a system gain factor GT and presented to biasing system 930. In a mechanical biasing system, amplitude control 980 provides a signal for obtaining a desirable peak-to-peak angle of rotation commanded by biasing means 930. Biasing system 930, as will be explained in more detail below, is provided with a constant bias determined by amplitude control 980 incrementally changed by a value determined by third signal processing means 950 for controlling the value of the ZRC phase angle. In a mechanical biasing system, biasing system 930 is controlled in such a way as to vary the back and forth rotation angle about the gyro input axis so that ZRC phase angle has determined values.

Biasing means 930 functions in a similar manner to biasing means 130 in FIG. 1. Biasing means 930 provides a means for introducing a varying bias in the frequency of at least one of said beams of electromagnetic radiation counter-traveling in ring laser gyro 900 thereby introducing a varying frequency difference, alternating in sign, between said waves of electromagnetic radiation. Biasing means 930, however, differs from biasing means 130 in FIG. 1 insofar as biasing means 930 is responsive to a biased control signal provided by third signal processing means 950 for affecting the bias in such a manner to affect the characteristic of the varying frequency difference between the counter-traveling waves to produce a determined value of the ZRC phase angle. In the case of a biasing means which provides mechanical rotation of ring laser gyro 900, the bias control signal provided by a third signal processing means 950 will affect biasing means 930 so as to affect the amplitude of the mechanical back and forth angle of rotation about the gyro input axis. This in effect will affect the integrated frequency difference between the counter-traveling waves, and thus affects the phase angle at the instant of $\dot{\psi}$ being zero, and changes polarity, which of course, is indicative of a change in the polarity of the frequency difference between the counter-traveling beams, and is the ZRC phase angle as aforesaid.

The system presented in FIG. 9 is equally applicable in a feedback biasing system arrangement where the biasing means 930 is part of an electrical or optical biasing system which directly affects the counter-traveling beams in ring laser gyro 900 without mechanical rotation about the input axis. Like the mechanical biasing arrangement, the third signal processing means 950 affects biasing means 930 so as to also introduce a varying bias in the frequency of at least one of the counter-traveling waves in ring laser gyro 900 and thereby produce a varying frequency difference, and more importantly, affect the instantaneous phase angle between the two counter-traveling waves at the point when $\dot{\psi}$ changes polarity.

Figure 10:
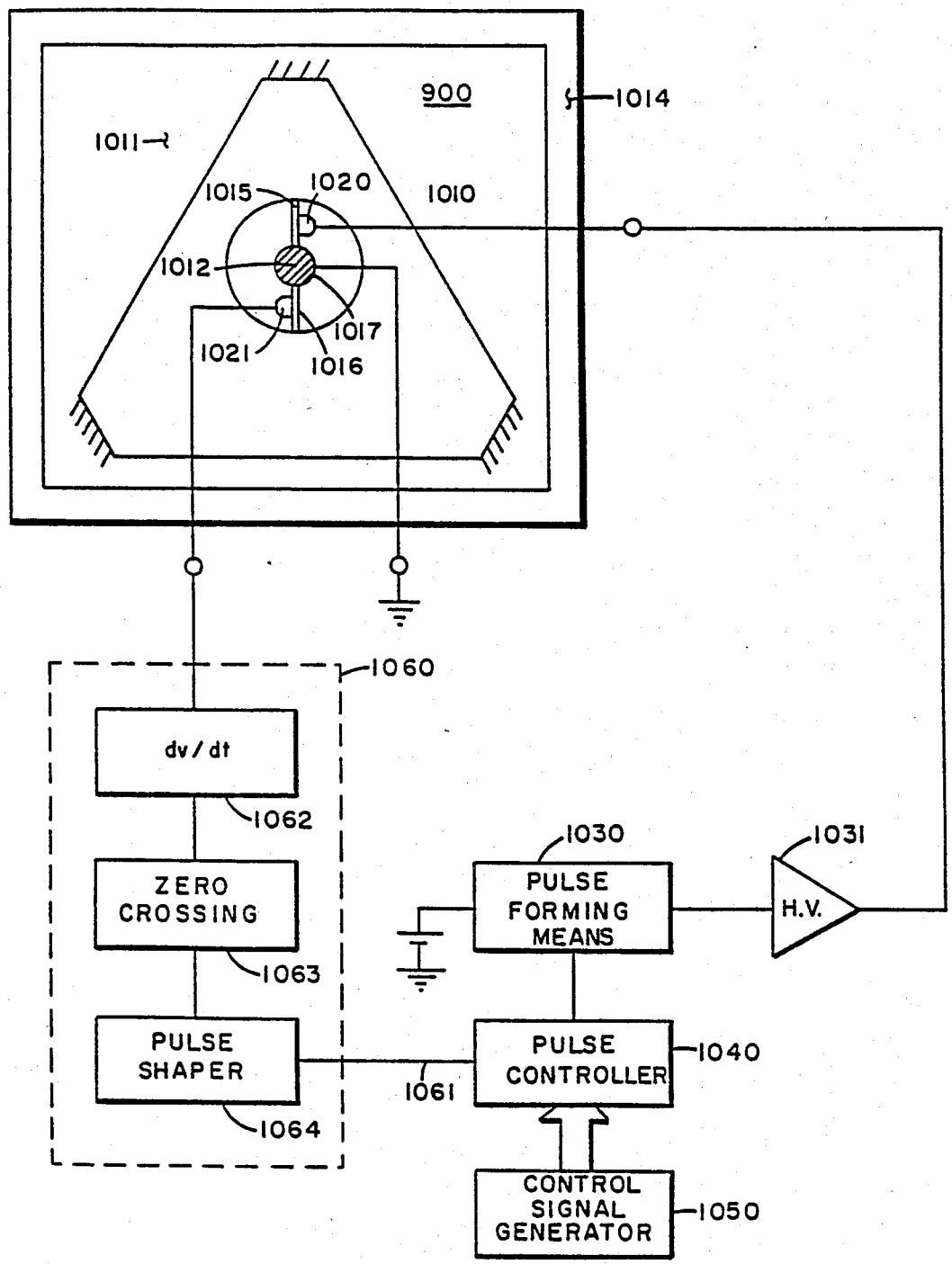
FIG. 10 is a diagramatic representation of a biasing system.

It is helpful in understanding the present embodiment of the invention to have a more detailed understanding of one example of a biasing system arrangement of biasing means 930 and how it is coupled to ring laser gyro 900. Consider the biasing system arrangement substantially shown in FIG. 10. Ring laser gyro 900 is shown in FIG. 10 where the closed-loop path is indicated by reference numeral 1010 and is secured to a base means 1011 which supports the closed-loop path lying in a plane parallel to base means 1011 and supports the two counter-traveling beams which travel along the closed-loop path. Ring laser gyro 900 is intended to measure rotation about axis 1012 which is normal to the plane which forms the closed-loop path. Further, base means 1011 is coupled to a second base means 1014 through two or more leaf springs indicated by leaf springs 1015 and 1016, and a shaft 1017 affixed to second base means 1014. In this arrangement of ring laser gyro 900, the base 1011 is allowed to rotate about axis 1012 which is substantially concentric with shaft 1017 affixed to base means 1014 through leaf springs 1015 and 1016. Thus, base 1011 can rotate back and forth about axis 1012 relative to base 1014. A system of this configuration is substantially a high-Q spring-mass system. By applying a controlled torque to at least one of the leaf springs, rotation and the amplitude of rotation angle can be controlled.

One example of controlling the mechanical rotation is also shown in FIG. 10. Bidirectional piezoelectric devices 1020 and 1021 are shown coupled to leaf springs 1015 and 1016 respectively. Piezoelectric device 1020 is a means for torquing leaf spring 1015, and piezoelectric device 1021 is a means for measuring the amount of torque applied by piezoelectric device 1020. Combined with appropriate circuitry the arrangement shown in FIG. 10 becomes part of an electromechanical oscillator having a high-Q.

Consider now the electrical system for driving the piezoelectric device 1020 for producing back and forth motion of base means 1011 about axis 1012 relative to base means 1014. A pulse forming means 1030 applies electrical pulses to piezoelectric device 1020 through a high voltage amplifier 1031. These pulses are alternated in polarity and are synchronized with the output of piezoelectric device 1021 as will be more fully described. The characteristic of the pulses provided by pulse forming means 1030 can be pulse width modulated or amplitude modulated, or the like. The system shown in FIG. 10 is an example of a system utilizing pulse width modulation for controlling the amount of rotation of base 1011 relative to base 1014. As shown, pulse controller 1040 is controlled by a control signal generator 1050 for controlling pulse forming means 1030 which provide pulses applied to the piezoelectric device 1020. Pulse controller 1040 is synchronized with the instances of rotational direction change of base 1011 relative to base 1014—instances of direction change ultimately causing $\psi$ to go through zero, and change polarity. This is so for the usual situation in which the rotation rate caused by the dither is greater than the inertial input rotation rate. Synchronization is accomplished by taking the output of piezoelectric device 1021 for processing by turnaround direction indicator 1060 which produces a SYNC pulse presented to pulse controller 1040 through connecting means 1061.

Turnaround indicator 1060, by way of example, is shown comprised of a voltage differentiator 1062, the output which is fed to a zero crossing indicator 1063, the output of which is applied to a pulse shaping circuit 1064. The output of the pulse shaper 1064 is presented to the pulse controller 1040 through connecting means 1061.

Turnaround indicator 1060 essentially provides SYNC pulses presented to pulse controller 1030 so that pulse controller 1040 can provide gating signals to pulse forming means 1030 through connecting means 1041 relative in time to the SYNC pulse. It should be noted that SYNC pulses could be obtained from $\psi$ logic signals at the output of second signal processing means 940. However, this is a matter of choice.

Figure 11:
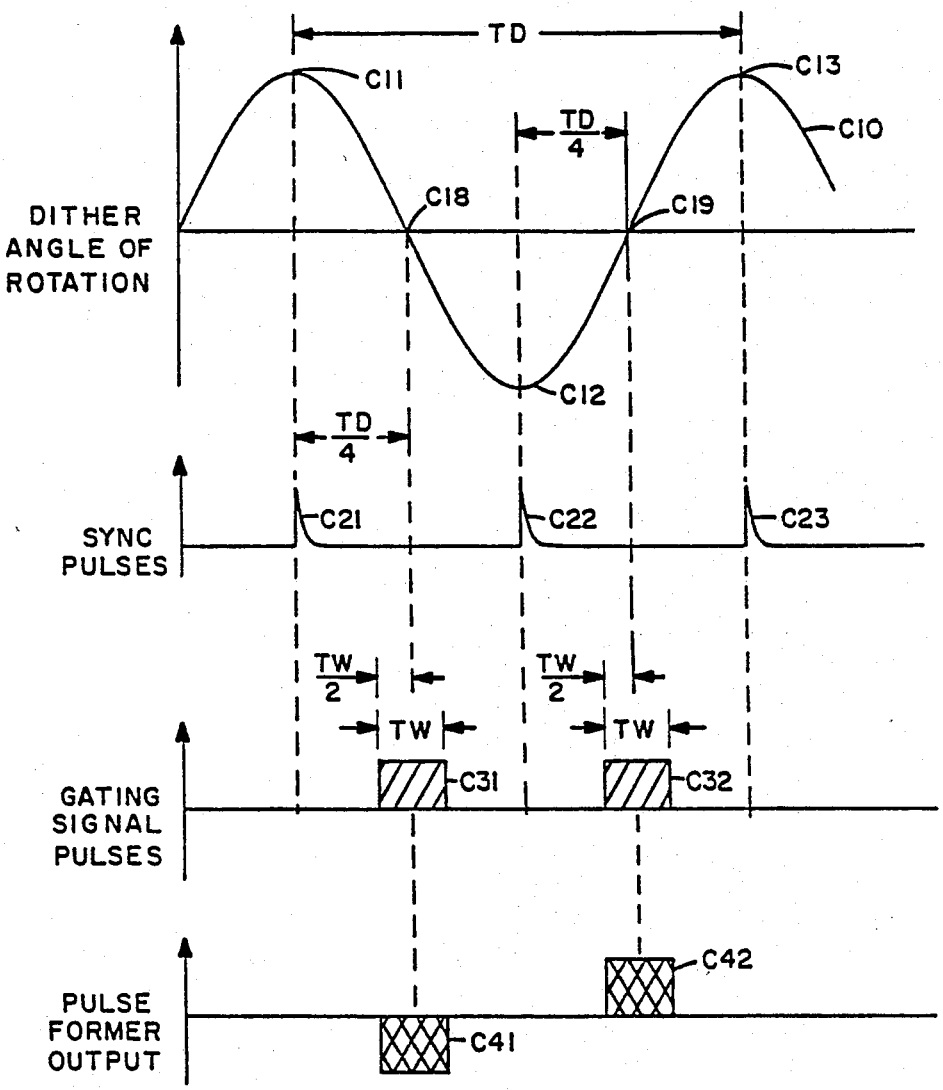
FIG. 11 is a graphical representation of the operation of the biasing system of FIG. 10.

The operation of the biasing means just described will now be presented with reference to FIGS. 10 and 11. The combination of the biasing system comprised of base 1011, leaf springs 1015 and 1016 forms a spring-mass system having a resonant frequency hereafter referred to as the dither frequency, FD. Associated with the dither frequency is the dither period, TD. For purposes of the following discussion, assume that control signal generator 1050 generates a signal corresponding to a desired pulse width to be provided by pulse forming means 1030 of finite time width, TW whereby the pulse controller, 1040, applies a gating signal to pulse forming means 1030 at a start time corresponding to:

$$t(START) = TD/4 - TW/2$$

and the gating signal is withdrawn at a time corresponding to:

$$t(STOP) = TD/4 + TW/2$$

A graphical representation of the synchronized gating of pulse forming means 1030 just described is shown in FIG. 11. In FIG. 11, curve C10 represents the angle of rotation about the gyro input axis 1012 in FIG. 10. Instances of turnaround, that is, change in direction of rotation of the base 1011 about the axis 1012 are indicated on curve C10 at points C11, C12, and C13 changes in direction are detected by zero crossing detector 1064 responsive to the output of differentiator 1062. At turnaround, the output of differentiator 1062 is zero resulting in a SYNC pulse at the output of pulse shaper 1064. Each time a change of direction occurs, a SYNC pulse is provided by the turnaround indicator, 1060, and is indicated in FIG. 11 by SYNC pulses C21, C22, and C23. Pulse controller 1040 combines the SYNC pulses with the output of the control signal generator 1050 generating the value of TW, and provides a gating signal to pulse forming means 1030. The gating signals are indicated by pulses C31 and C32. The width of gating signals C31 and C32 is equal to the value of time, TW, generated by control signal generator 1050. The start and stop times of the gating signals are measured from the SYNC pulse, for example, C21 and C22.

The start and stop time of the gating signal relative to the SYNC pulse assumes a known dither frequency, FD and corresponding period, TD. The value of FD may or may not be the actual resonant dither frequency of the specific laser angular gyro spring-mass system of which the biasing system is applied, but should be reasonably close. If the value of the derived pulse width TW is small relative to the resonant dither period, TD, small variations in the value of TD chosen relative to the actual resonant dither period will have a minimal effect with respect to the dither frequency of the spring-mass system. In other words, the spring-mass system will dither at its actual resonant frequency, FD.

The actual dither angle amplitude for each direction of movement of the biasing system shown in FIG. 10 is primarily related to the value of the pulse width TW provided by control signal generator 1050 prior to the next turnaround. In the above example, it was assumed that control signal generator, 1050, was constant. In this situation, after the system is turned on, the dither angle amplitude will grow until the gain is equal to the losses of the spring-mass system resulting in a substantially constant peak-to-peak dither angle amplitude, the angle of rotation sinusoidally varying. A change in time TW provided by control signal generator 1050, will affect the dither angle amplitude, each pulse contributing to one or the other direction of peak amplitudes. The relationship between the change in amplitude of rotation for a change in pulse width, TW, is dependent upon the relative placement of the gating signal pulses relative to the zero angle of rotation indicated by points C18 and C19 on curve C10 in FIG. 11. If the center of the enabling pulses, and more particularly the centering of the applied pulses to piezoelectric device 1020 are centered exactly at instances indicated by points C18 and C19, a maximum linear relationship should exist between a change in rotation angle for a change in value of pulse width, TW. The actual starting of the gating signal pulses is dependent upon the chosen constant, TD, which is assumed to be the period of the resonant dither frequency, FD. This may or may not be the case because of the many variables which will contribute to the resonant dither frequency of the specific spring-mass system in question. However, if the pulse width, TW, provided by control signal generator 1050 is small relative to the dither period, TD, and the chosen value of TD being very close to the actual value of TD, there will exist a very linear relationship between the amplitude of the angle of rotation and the value of the pulse width, TW, provided by the control signal generator, 1050. On the other hand, deviation from the actual resonant dither period, TD, from the chosen constant value, TD, will tend to degenerate the linear relationship desired.

In summary, the biasing system presented in FIG. 10 provides a means for controlling the peak dither angle amplitude for each direction of rotation as a function of a single input signal, TW, provided by control signal generator 1050. A change in the dither angle amplitude will constitute a change in the ZRC phase angle—the instantaneous phase angle at turnaround, namely points C11, C12, and C13 indicated in FIG. 11. Further, if the lock-in error parameters (F's) indicated by equation (21) can be reduced to zero by control of the ZRC phase angle, the gyro output angle from the first signal processing means 920 in FIG. 9 can be devoid of any lock-in error or substantially reduced. The control signal generator, 1050 in FIG. 10 is essentially the combination of third signal processing means 950 and amplitude control 980, the outputs thereof being summed by summing means 960. The output of summing means is substantially the output provided by control signal generator 1050 in FIG. 10. The output of summing means 960 is primarily varied by third signal processing means 950 which responds to the lock-in error parameter signals, functions of the ZRC phase angle. A detailed description of the third signal processing means, 950, and the control scheme therewith will now be presented.

Equation (10) and corresponding equation (11) in the above text, describes the incremental angular error from a single passage through zero rotation rate during one-half of a dither cycle—zero rotation rate corresponding to $\psi$ being equal to zero. Combining and rewriting equations (11a) and (11b), and equation (15), the accumulated lock-in error is obtained by summing the individual error occurring at each of the positive and negative ZRC's:

$$\epsilon = \sum_{j=1}^{m} \delta\theta_{ij}^{+} + \sum_{j=1}^{m} \delta\theta_{ij}^{-} \quad (22)$$

From equations (14) and (15) above, equation (22) can be rewritten:

$$\epsilon = \sum_{i=1}^{n} C_i F_i \quad (23)$$

where, for this example, n=4.

In the above text, a means for generating the lock-in error parameters, Fi's, and characteristic signature coefficients, Ci's was discussed for determining the total lock-in error, $\epsilon$, for direct subtraction from the output. In the discussion which follows, a means for controlling the lock-in error parameters to remain near zero will be introduced.

In equation (23) the accumulated lock-in error can be determined by observation of the lock-in error parameters as already discussed. If the lock-in error parameters as indicated in equation 23 are reduced to zero, the total accumulated lock-in error, $\epsilon$ in the gyro output angle of the first signal processing means 920 in FIG. 9 will be reduced to zero regardless of the value or knowledge of the characteristic signature coefficients, (C's).

Control is accomplished by forcing subsequent values of the sine and cosine values of the ZRC phase angle to be such that F1, F2, F3 and F4 converge to zero and thus the lock-in error, $\epsilon$, converges to zero. This control scheme may be mathematically represented by a vector relationship represented by present values of the lock-in error parameters based on past values of ZRC phase angles, and determination of a future occurring ZRC phase angle affecting the future occurring incremental error parameters, $\Delta$F's as will be described.

Considering F1 and F2 as two orthogonal elements of a vector $\vec{F^+}$, and $\Delta F_1$ and $\Delta F_2$ as two orthogonal elements of a vector $\vec{\Delta F^+}$, the greatest reduction in $\vec{F^+}$, and thus F1 and F2, is achieved by making $\vec{\Delta F^+}$ lie negative along the direction of $\vec{F^+}$, and is mathematically expressed by:

$$\vec{\Delta F^+} = -\frac{1}{\sqrt{|\dot{\psi}|_o}} \frac{\vec{F^+}}{|\vec{F^+}|} \quad (24)$$

where $\vec{\Delta F^+} = \Delta F_1 \vec{i} + \Delta F_2 \vec{j}$ $\vec{F^+} = F_1 \vec{i} + F_2 \vec{j}$ Substituting equations (13a) and (13b) into equation (23) and equating corresponding vector components produces, $$\frac{\cos\psi_o^+}{\sqrt{|\dot{\psi}_o|}} = -\frac{1}{\sqrt{|\dot{\psi}_o|}} \frac{F_1}{\sqrt{F_1^2 + F_2^2}} \quad (25)$$

$$\frac{\sin\psi_o^+}{\sqrt{|\dot{\psi}_o|}} = -\frac{1}{\sqrt{|\dot{\psi}_o|}} \frac{F_2}{\sqrt{F_1^2 + F_2^2}} \quad (26)$$

From equations (25) and (26), the desired ZRC phase angle for positive $\psi_o$ is calculated:

$$\psi_o^+ = \tan^{-1}\left[\frac{-F_2}{-F_1}\right] \quad (27)$$

where the solution of the arc tangent is required in all quadrants.

In a similar manner, F3 and F4 can be considered as two orthogonal elements of a vector $\vec{F^-}$, and $\Delta F_3$ and $\Delta F_4$ as two orthogonal elements of a vector $\vec{\Delta F^-}$. Following the same development described above, the desired ZRC phase angles for negative $\psi_o$ is calculated to be $$\psi_o^- = \tan^{-1}\left[\frac{-F_4}{-F_3}\right] \quad (28)$$

where the solution to the arc tangent is required in all quadrants.

The value of $\psi_o^+$ expressed in equation (27) is a determination of the desired ZRC phase angle at a future occurring or the next turnaround where $\dot{\psi}_o$ is positive corresponding to an angular acceleration of rotation which is positive, and equation (28) represents an expression for the value of the ZRC phase angle where $\dot{\psi}_o$ is negative corresponding to an angular acceleration of rotation which is negative. If the next occurring ZRC phase angles are within plus or minus $\pi/2$ radians of the values determined in equations (27) and (28), the lock-in error parameters will decrease resulting in a reduction in the accumulated lock-in error, as expressed in equation (23) and subsequent reduction of lock-in error contained in the gyro output angle provided by first signal processing means 920.

Referring again to FIG. 9, third signal processing means 950 processes the lock-in error parameter signals, as indicated by the expressions for the F's in equation (23), and applies the control scheme in accordance with equation (24) such as that just presented, for providing an output signal for controlling biasing means 930 resulting in the next ZRC phase angles to be those values as presented in equations (27) and (28). The success of the feedback biasing arrangement and control scheme just presented depends on the ability of the feedback biasing system arrangement to provide reasonably accurate control of the ZRC phase angle.

The ZRC phase angle is, of course, dependent not only upon the motion applied by biasing means 930 in FIG. 9, but also depends upon the base motion or input motion which the ring laser gyro is intended to measure. The third signal processing means 950 in FIG. 9 must provide a means for predicting the total response of the feedback biasing system arrangement so that third signal processing means 950 may provide appropriate signals to obtain the desired ZRC phase angles in the presence of input motion so that the error contained in the gyro output angle from first signal processing means 920 is minimized. The exposition which follows presents a method for producing a control signal from third signal processing means 950 which will provide control of the ZRC phase angle with the requirements set forth in the discussion of equations (27) and (28).

The control action implied by equations (24) through (28) requires that future ZRC phase angle values be affected to reduce the resulting values of the lock-in error parameters (F's). This, of course, assumes that a history of ZRC phase angle measurements has already been obtained and stored for future processing. Assuming a dithering system as that substantially shown in FIG. 10 which periodically applies torques to the leaf springs as described, the ZRC phase angle measurements are a function of these applied torques and external disturbances about the gyro input axis which include the inertial rotation input rate or base motion also about the gyro input axis. The external disturbances must be accounted so that the effect of a change in applied torque can be isolated. To reduce the effect of the external disturbances, namely the true rotation rate input, it is desirable to predict and control the next ZRC phase angle based on the most current data. It is important to distinguish in the following discussion between the ZRC phase angle between positive and negative values of $\psi$ so that proper control is provided.

Figure 12:
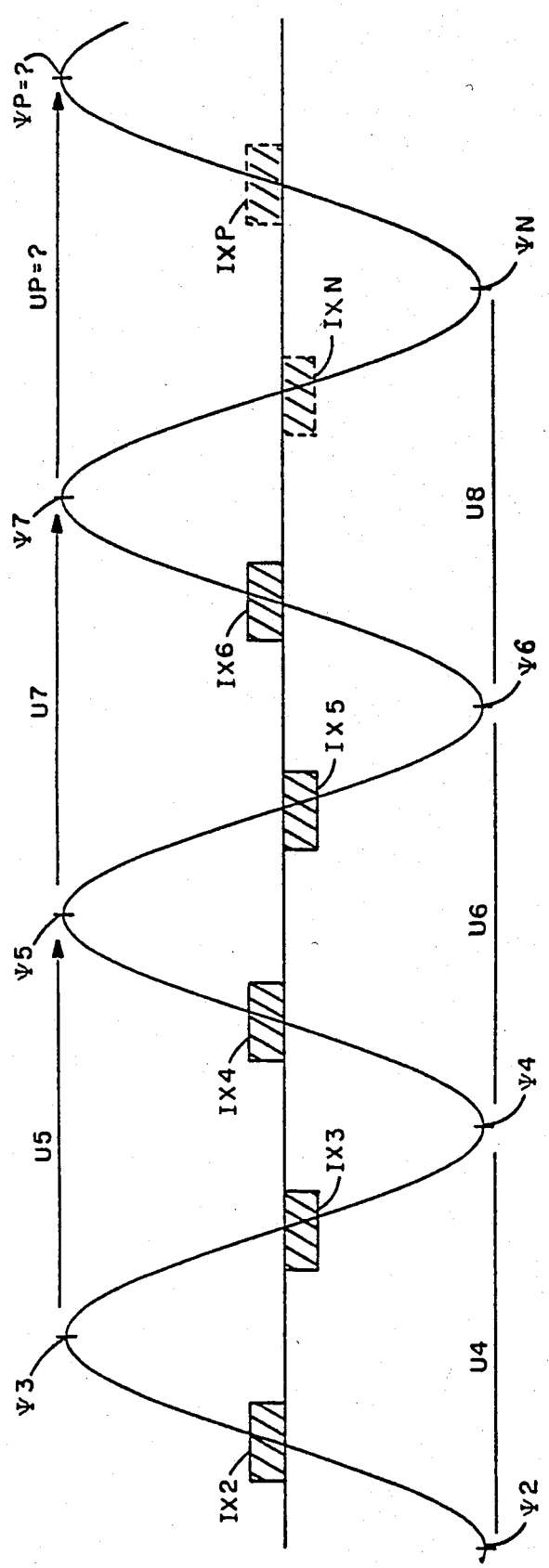
FIG. 12 is a graphical representation of the control scheme of the system of FIG. 9.

FIG. 12 graphically presents several dither cycles, and superimposed thereon are the applied control torques. The control torques are shown in FIG. 12, indicated by "IXn" centered around the midpoint between the ZRC phase angles, i.e. maximum dither angle amplitudes, although this is not necessary for system operation as discussed above relative to FIG. 10. The applied control torques are indicated in FIG. 12 by "IXn". In the following discussion, "IXn" represent an incremental control torque expressed in units of radians which is added to a constant value. Since the applied control torque is a quantity of energy, the effect of the incremental control torque is an incremental effect on the angular value of $\psi_o$ and in the specific example, the dither angle amplitude.

Referring to FIG. 12, assume that laser gyro 900 has been dithered for some time and that the last ZRC measurement which was made is $\psi7$, some time before the application of the applied control torque, IXN. Further assume that the incremental control torque IXN has been calculated and corresponds to the control torque which will be applied before the occurrence of $\psi$N. It is the object of the third signal processing means, 950 in FIG. 9 to provide a control signal representative of the incremental control torque IXP to be applied prior to the ZRC phase angle indicated by $\psi$P for control thereof. In this situation, $\psi$P is the desired value of the ZRC phase angle which will cause the vector $\overline{F^-}$, comprised of F3 and F4 as indicated in equation (24), to be reduced and thus reduce the amount of error contained in the gyro output.

One approach for predicting the amount of torque to be provided by IXP to produce the next ZRC phase angle, $\psi$P, is to predict the response of the feedback biasing system in the presence of an inertial input rotation rate by examining the history of the ZRC phase angles. This can be accomplished by comparing the values of successive ZRC phase angles of a chosen polarity of $\psi$, or it is also possible to predict $\psi$P based on successive ZRC phase angles of alternating polarity of $\psi_o$. There are many different control approaches in addition to the above two just exemplified for predicting the value of IXP to produce the "next" ZRC phase angle, $\psi$P. The following description considers only the former approach, that is, looking at successive ZRC phase angles of the same polarity of $\psi_o$.

Assume that the change in inertial input rotation rate is relatively slow and the dither frequency is relatively fast. It follows then, that the change in ZRC phase angle "U" excluding input control torques, is approximately the same from one ZRC phase angle to the next ZRC phase angle of the same $\psi$ polarity. For example, in FIG. 12, UP is assumed to be substantially equal to U7. Defining U as a first order predictor, a general expression for U may be written as:

$$U_i = \psi_i - \psi_{i-2} + (-1)^i(IX_{i-1} + IX_{i-2}) \tag{29}$$

In the particular example, U7 and U5 are calculated to be:

$$U7 = \psi7 = \psi5 - (IX6 + IX5)$$

$$U5 = \psi5 - \psi3 - (IX4 + IX3)$$

A further refinement in predicting the value of UP is to look at the previous first order predictor, U5, and correct the value of UP by the change in the value between U7 and U5. This may be generally represented by the mathematical expression:

$$E1 = U_i - U_{i-2} \tag{31}$$

Using this error, E1, UP can be predicted in the general form:

$$U_{i+2} = U_i + E1 \tag{32}$$

In the specific example illustrated in FIG. 12, and substituting in equation (31) and (32), UP is calculated to be:

$$UP = U7 + (U7 - U5) \quad (33)$$

Since $\psi P$ will depend upon the value of IXP and IXN, an expression for the value of $\psi P$ in a general form can be mathematically expressed by:

$$\hat{\psi}_{i+2} = \psi_i - (-1)^i (IX_i + IX_{i+1}) + U_{i+2} \quad (34)$$

The left-hand side of equation (34) is a predicted value of $\hat{\psi}$ (i+2) based on applied torques and is indicated by the "hat" above the term. Substituting the appropriate solution of equations (27) and (28), which satisfies the intended control function, for the left-hand side of equation (34) and solving for the value of IX (i+1) yields:

$$IX_{i+1} = (-1)^{-i}(\psi_i - \psi_{i+2} + U_{i+2}) - IX_i \quad (35)$$

In the particular example illustrated in FIG. 12, $\psi P$ is determined from equation (27) and substituted in equation (34) yielding:

$$\psi P = \psi 7 + (IXP + IXN) + UP \quad (36)$$

$$IXP = (-1)(\psi 7 - \psi P + UP) - IXN \quad (37)$$

In the above analysis, IXN was assumed to be known and was calculated based on the ZRC measurement $\psi 6$. Thus, in a similar manner the application of the general equations (34) and (35) and control equation (28) can be utilized for calculating subsequent values of $\psi N$, $\psi N$ being the ZRC phase angles having the opposite polarity $\psi$ as those ZRC phase angles related to $\psi P$.

Figure 13:
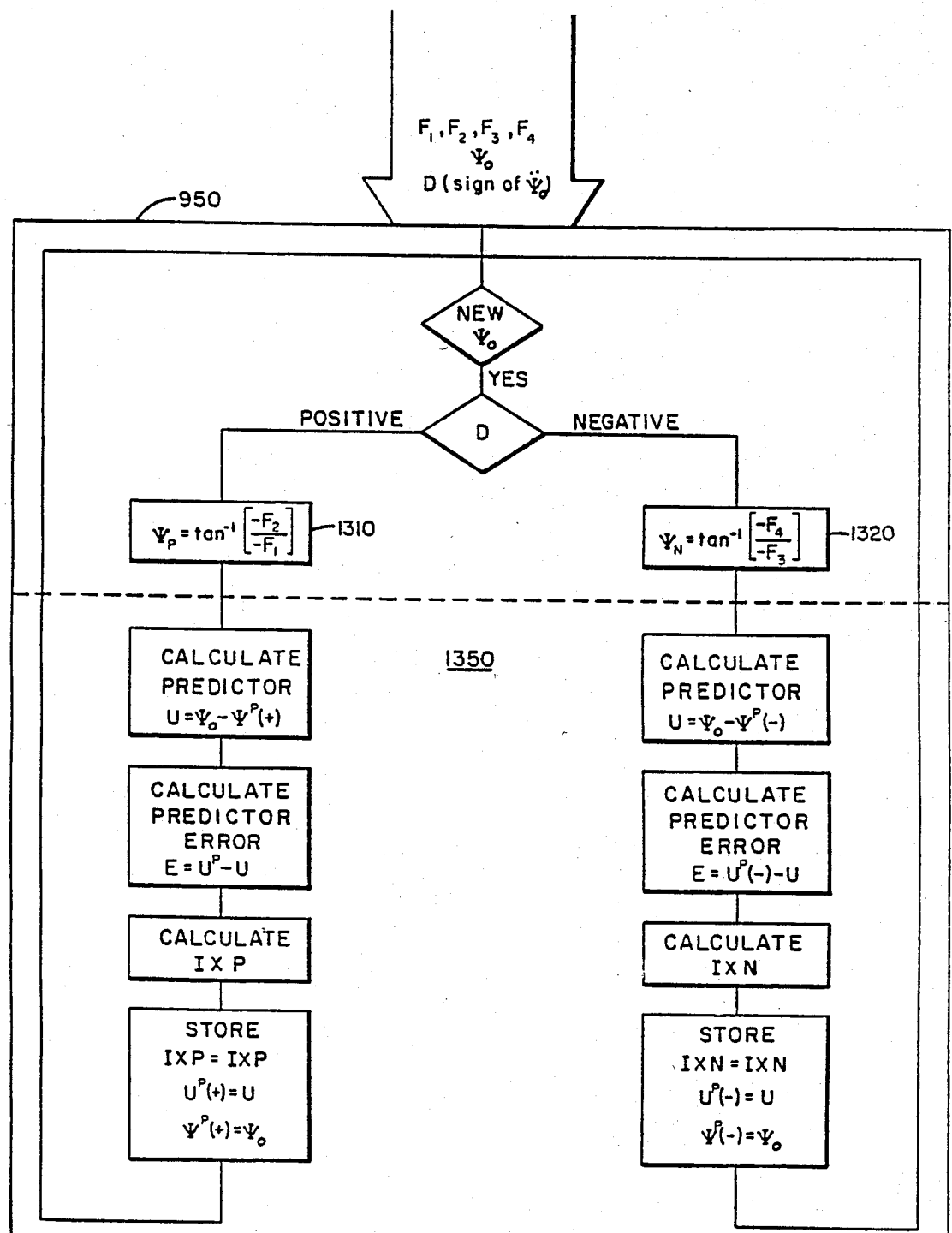
FIG. 13 is a flow diagram of a signal processing system of FIG. 9.

Third signal processing means 950 receives signals from second signal processing means 940 representative of the incremental lock-in error parameters, (F's), the most recent ZRC phase angle, $\psi_o$ and D, the polarity of $\psi_o$. In turn, third signal processing means 950 calculates a future or next desired value of the ZRC phase angle, $\psi P$ or $\psi N$, determined substantially by equation (27) and equation (28) respectively. The operations so far described are illustrated in the flow diagram shown in FIG. 13 representing the operation of third signal processing means 950. A selected one of block 1310 and 1320, dependent upon the polarity of $\hat{\psi}$(D), operates on current data representative of the lock-in error parameters and calculates the desired value of $\psi P$ or $\psi N$ respectively. Subsequent to calculating $\psi P$, or $\psi N$, the value of the incremental control torque IXP or IXN is calculated based on past performance data using the "predictor" control scheme described above associated with equations (29) through (37). Third signal processing means requires sufficient memory storage for storing past values of the zero rate crossing phase angles as well as past calculated command values of the incremental control torques IXP and IXN. The process of calculating the incremental control torques is indicated by the section of the flow diagram shown in FIG. 13 below the dashed line and indicated by reference numeral 1350.

The output of third signal processing means 950 indicated by numeral 951 in FIG. 9 and also indicated by 951 in FIG. 13 is a signal representative of an incremental control torque which is to be applied to the laser gyro 900 to obtain the zero rate crossing phase angle to satisfy the intended control function substantially described by equation (24). Third signal processing means 950, therefore, can be provided by any computer, computation device, microprocessor, and the like, for performing appropriate parameter storage, timing synchronization, and mathematical calculations associated with equation (29) through (37) and providing a control signal representative of the incremental control torques.

The output of third signal processing means 950 is summed with the output of amplitude control 980 by a summing means 960. The output signal of amplitude control 980 represents a desired constant value representative of a substantially constant desired peak phase angle or amplitude, whereas the output of the third signal processing means 950 is an incremental value of phase angle amplitude which is added to the constant value output of amplitude control 980. The output of summing means 960 is therefore a signal representative of the desired total phase angle change, $\Delta \psi$ or in other words the dither angle amplitude of laser gyro 900 provided by biasing means 930. The output of summing means 960 is multiplied by a scale factor or gain, GT by block 970. Block 970 also includes signal conversion processing compatible with biasing means 930.

In the exemplary biasing system described with reference to FIG. 10, the output of gain block 970 indicated by numeral 971 and the preceding circuitry thereto represents the control signal generator 1050 in FIG. 10 for controlling the dither system and particularly the applied torques to gyro 900. With a biasing system such as that shown in FIG. 10, gain block 970 includes signal conversion processing for providing a signal representative of the desired pulse width, TW, of torque pulses which would be applied to gyro 900 as described above.

Of course, if the biasing system chosen was an amplitude modulated system, the signal conversion process provided by gain block 970 would provide an output signal representative of the desired pulse amplitude of torque pulses which would be applied to laser gyro 900. Thus, gain block 970 is designed to be compatible with the chosen biasing means 930 which, as stated above, can be a mechanical (rotating) biasing system or an electrical/optical biasing system.

The above analysis placed no restrictions upon the values of the control torques IXP and IXN and were assumed small. These in turn were added to a desired peak-to-peak constant amplitude provided by amplitude control 980 summed by summing means 960, the output of which controls the amplitude of rotation angle about the gyro input axis. Further, associated with the feedback biasing system arrangement are at least two system gains. The first gain, is the conversion from the values calculated, IXP and IXN, to a control signal utilized by the biasing system represented by that shown in FIG. 10 which converts the system parameters IXP and IXN to an actual amplitude modulation or pulse width modulation of the pulse forming means 1030 in FIG. 10. This gain has been indicated by block 970 in FIG. 9. Furthermore, associated with the biasing system described in FIG. 10 is an output gain which is essentially the sensitivity of the ZRC phase angle or amplitude of the dithering system to the pulse width or pulse amplitude.

Figure 14:
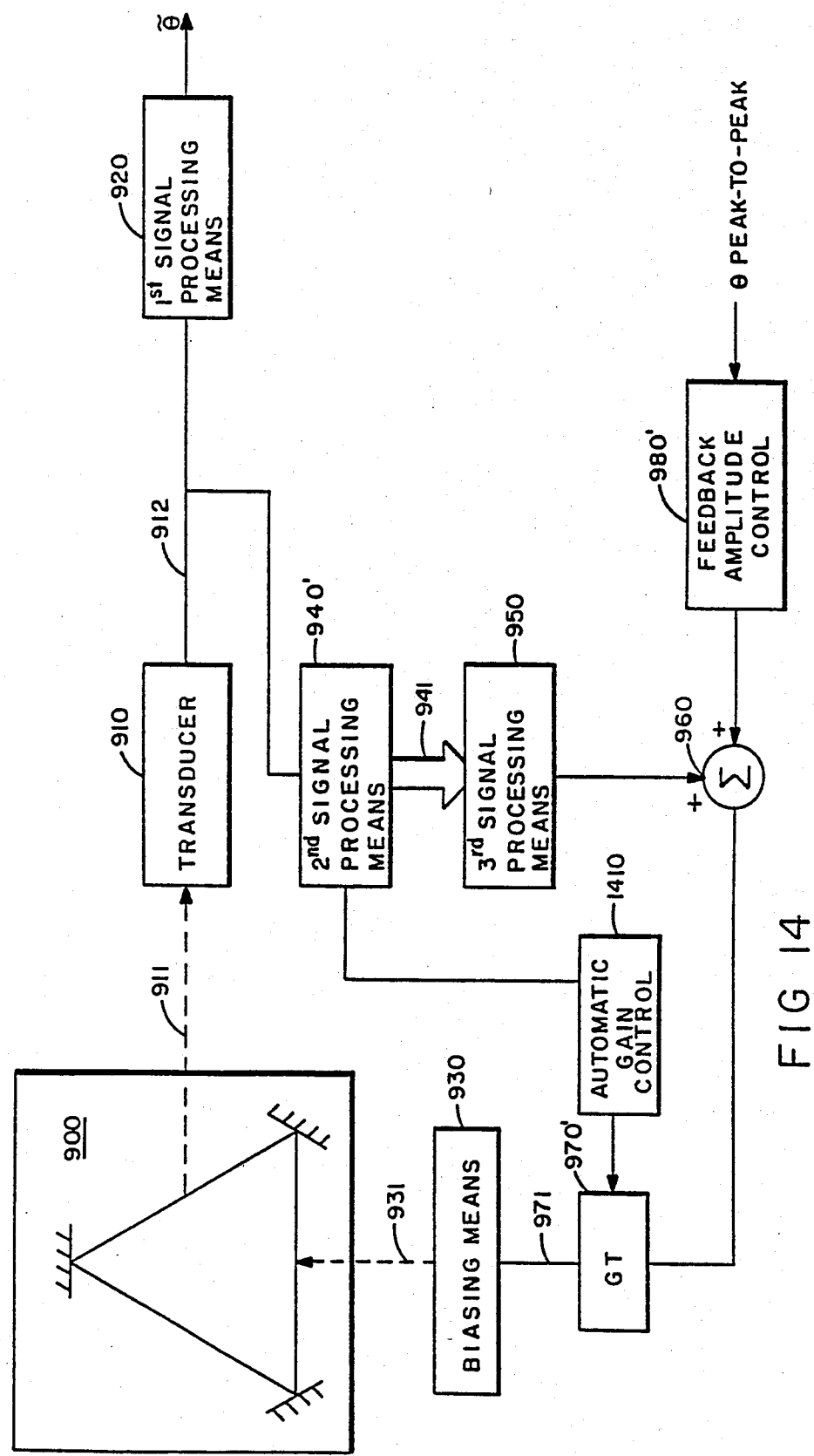
FIG. 14 is another embodiment of the invention utilizing a feedback dither control.

A combination of an amplitude control and/or an automatic gain control to laser gyro system of FIG. 9 is desirable in some circumstances for improved system performance. The system shown in FIG. 14 is another embodiment employing the principles of the invention which is essentially similar to that of FIG. 9 with the addition of an automatic gain control and a feedback amplitude control. In FIG. 14, similar functioning system blocks as those in FIG. 9 have identical numeral designations. The amplitude control, 980, in FIG. 9 has been replaced by feedback amplitude control 980' in FIG. 14. The system gain block, 970, in FIG. 9 has been replaced by gain block 970', and second signal processing means 940 in FIG. 9 has been replaced by second signal processing means 940'. Added to the system of FIG. 9 is an automatic gain control block, 1410.

The peak-to-peak dither angle is dependent upon the amplitude control torques from biasing means 930 for dithering laser gyro 900. The control torques must be sufficient to overcome the losses within the spring-mass system of the biasing system described with reference to FIG. 10. It is desirable that the torquing current should be kept as low as possible and remain within a linear region so as to reduce the power requirement of the biasing system. Thus, it is desirable to maintain a substantially constant peak-to-peak dither angle amplitude which in turn confines the amount of energy needed by the biasing system. The feedback amplitude control, 980', in FIG. 14 provides a variable signal in response to an input signal indicative of the peak-to-peak dither angle amplitude to summing means 960 which in turn is amplified by gain block, 970', for controlling biasing means 930. The peak-to-peak signal required by amplitude control 980' may be provided by signals derived from transducer 910 for determining the peak-to-peak dither angle or may be obtained from signals derived from mechanical rotation forced upon laser gyro 900. Since the first signal processing means 920 usually contains up and down counters for counting the number of $2\pi$ radian phase changes in the phase angle between the counter-traveling beams, signals representative of the peak-to-peak dither angle are available therefrom. Feedback amplitude control 980' may be implemented using a selected one of variety control schemes and can be implemented by a microprocessor and the like.

In FIG. 9, the gain block, 970, is so chosen that values produced by third signal processing means 950 and values provided by the amplitude control 980 are multiplied by the system gain which convert signals therefrom into changes in the ZRC phase angle based on the predicting equations as discussed relative to equations (29) through (37). The accuracy of the system and in particular how fast can the lock-in error parameters be driven toward zero depends upon the accuracy of the gain value chosen for gain block 970. In order to improve accuracy, the system of FIG. 14 includes gain block 970' responsive to automatic gain control, 1410, responsive to the prediction of the next ZRC phase angle and the actual ZRC phase angle obtained for modifying the value of gain block 970'. In operation, the automatic gain control continually modifies the gain of gain block 970' so that the control signals provided by third signal processing means 950 are multiplied by the appropriate gain value so that the difference between the ZRC phase angle obtained and that which is desired is minimal.

The processes described above are for a four parameter model including four lock-in error parameters (F's) and four coefficients (C's). From equations (12a) and (12b) it is clear that there is a corresponding two parameter model. The model is described below in terms of coefficients $C_{1*}$ and $C_{2*}$ and lock-in parameters $F_{1*}$ and $F_{2*}$, where $$C_1^* = \sqrt{\pi}\,\Omega_L(\sin\beta - \cos\beta) \tag{38}$$

$$C_2^* = -\sqrt{\pi}\,\Omega_L(\sin\beta + \cos\beta) \tag{39}$$

$$\Delta F_1^* = \frac{1}{\sqrt{|\dot\psi_o|}}\sin\psi_o^+ - \frac{1}{\sqrt{|\dot\psi_o|}}\cos\psi_o^- \tag{40}$$

$$\Delta F_2^* = \frac{1}{\sqrt{|\dot\psi_o|}}\cos\psi_o^+ + \frac{1}{\sqrt{|\dot\psi_o|}}\sin\psi_o^- \tag{41}$$

and summing over the ZRC's, $$F_1^* = \Sigma \Delta F_{1j}^* \tag{42}$$

$$F_2^* = \Sigma \Delta F_{2j}^* \tag{43}$$

The corresponding discussions that hold for the C's and F's also holds for the C*'s and F*'s. Thus equation (14) becomes:

$$\theta_c = \tilde\theta - \Sigma C_i^* F_i^*$$

for $i = 1, 2$

As in equation (24) with respect to the feedback biasing system arrangements of FIGS. (9) through (14), the control of $\psi_o^-$ and $\psi_o^+$ needed to reduce the magnitude of $F_{1*}$ and $F_{2*}$ requires the vector $\overrightarrow{\Delta F^*}$ to lie negative along the vector $F^*$ where $$\overrightarrow{\Delta F^*} = -\frac{1}{\sqrt{|\dot\psi_o|}}\frac{\overrightarrow{F^*}}{|\overrightarrow{F^*}|} \tag{46}$$

where $$\overrightarrow{\Delta F^*} = \Delta F_1^*\,\vec i + \Delta F_2^*\,\vec j \tag{47}$$

$$\overrightarrow{F^*} = F_1^*\,\vec i + F_2^*\,\vec j \tag{48}$$

For the positive ZRC's, substituting equations (40), (41), (47), and (48) into (46) and equating components of the vector produces $$\frac{1}{\sqrt{|\dot\psi_o|}}\sin\psi_o^+ = -\frac{1}{\sqrt{|\dot\psi_o|}}\frac{F_1^*}{|\overrightarrow{F^*}|} \tag{49}$$

$$\frac{1}{\sqrt{|\dot\psi_o|}}\cos\psi_o^+ = -\frac{1}{\sqrt{|\dot\psi_o|}}\frac{F_2^*}{|\overrightarrow{F^*}|} \tag{50}$$

The condition is imposed that when a positive ZRC occurs, only terms involving $\psi_o^+$ are included. From equations (49) and (50)

$$\psi_o^+ = \tan^{-1}\left[\frac{-F_1^*}{-F_2^*}\right] \tag{51}$$

In a similar manner the desired $\psi_o^+$ can be obtained, resulting in $$\psi_o{}^- = \tan^{-1}\left[\frac{-F_2{}^*}{F_1{}^*}\right] \tag{52}$$

The signal processing means 920, 940, and 950, and amplitude control 980, although indicated in FIG. 9 as separate signal processing means, may be combined entirely or selected portions thereof into a single processing means such as a general purpose computer, or a microprocessor, and the like. Further, selected portions of biasing means 930 shown in FIG. 10 and gain block 970 may also be combined into a single processing means along with those as aforesaid. Similarly, signal processing means 920, 940', 950, feedback amplitude control block 980', automatic gain control block 1410, gain block 970', and biasing means 930 may be combined entirely or selected portions thereof into a single processing means such as a general purpose computer and the like. Obviously, many modifications and variations of the present invention are possible in light of the above teachings. It is, therefore, to be understood that within the scope of the dependent claims the invention may be practiced otherwise as specifically described. Particularly, the apparatuses of FIGS. 1, 9, and 14 operate on the ZRC phase angle as a choice for obtaining incremental error parameters. However, a different choice of phase angle sampling, such as the phase angle when $\psi$ is a maximum, could also have been used. This, of course, would dictate a different but somewhat similar derivation, analysis, and control to that described above. From a practice standpoint, however, the ZRC phase angle is easily obtained since $\psi$ is indeed zero and transducer output signals are changing at the slowest rate.

The embodiments of the invention in which an exclusive property or right is claimed are defined as follows:

1. In an angular rate sensor of the class wherein two waves travel in opposite directions, each wave substantially traveling about a closed-loop path, wherein the frequency of each of said waves is a function of the rate of rotation of said closed-loop path and there being a phase relationship established between said waves also being a function of the rate of rotation of said closed-loop path, and wherein said sensor generates a first sensor signal related to the true angular rotation of said sensor but which includes lock-in error inherent in said sensor, the improvement comprising:
   sensing means responsive to at least one of said waves for providing at least a first output signal which is indicative of said phase relationship;
   phase angle determining means responsive to said sensing means first output signal for determining a phase angle value, $\psi$, corresponding to said phase relationship between said waves at each of selected occurrences of selected first time derivative values, $d\psi/dt$, of said phase relationship;
   biasing means, having an input means adapted to receive a bias control signal, for introducing a varying frequency bias in at least one of said waves resulting in a rate of change of said phase relationship to pass through zero at least once, said biasing means including means for affecting at least one of said waves so as to direct said phase relationship to some extent in response to said bias control signal; and
   bias control signal generating means for generating said bias control signal as a function of a plurality of selected ones of said phase angle values at past occurrences of said selected first time derivative values of said phase relationship.

2. The apparatus of claim 1 wherein said bias control signal generating means includes lock-in error parameter means for determining at least a first lock-in error parameter which corresponds to the accumulation of lock-in error in said first sensor signal, said lock-in error parameter means including:
   function means for obtaining values of at least a first selected function evaluated for selected ones of said phase angle values; and
   accumulating means for summing said first function values thereby providing a first lock-in error parameter, said bias control signal being a function of said first lock-in error parameter.

3. The apparatus of claim 1 wherein:
   said phase angle determining means includes means capable of determining said phase angle values in which said selected first time derivative values are substantially zero.

4. The apparatus of claim 3 wherein said bias control signal generating means includes:
   means responsive to said sensing means first output signal for determining a second time derivative value corresponding to each occurrence of said selected first time derivative value; and
   means for generating a plurality of incremental error parameters being substantially of the form $$\Delta F_1 = \frac{\cos\psi_o{}^+}{\sqrt{|\ddot\psi_o{}^+|}} \qquad \Delta F_3 = \frac{\cos\psi_o{}^-}{\sqrt{|\ddot\psi_o{}^-|}}$$

$$\Delta F_2 = \frac{\sin\psi_o{}^+}{\sqrt{|\ddot\psi_o{}^+|}} \qquad \Delta F_4 = \frac{\sin\psi_o{}^-}{\sqrt{|\ddot\psi_o{}^-|}}$$

where
   $\ddot\psi_o{}^+$, $\ddot\psi_o{}^-$ are positive and negative values of said second derivative value, respectively;
   $\psi_o{}^+$ is said phase angle when $\ddot\psi$ is positive;
   $\psi_o{}^-$ is said phase angle when $\ddot\psi$ is negative; and
   $\Delta F_1 \ldots$ are said incremental error parameters; and
   accumulating means for separately summing said plurality of incremental error parameters thereby providing a plurality of lock-in error parameters including those having substantially the functional form $$F_i = f\left\{\sum_{j=1}^{m} \Delta F_{ij}\right\} \quad \text{where } i = 1,2,3,4$$

where the summation, m, occurs for each occurring one of said selected first time derivatives having the same polarity of said corresponding second derivative, and i is one of said plurality of incremental error parameters, said lock-in error signal being a function of said plurality of lock-in error parameters.

5. The apparatus of claim 1 wherein said two waves are waves of electromagnetic radiation.

6. The apparatus of claim 5 wherein said two waves of electromagnetic radiation are in the form of laser beams and said laser beams substantially travel in opposite directions about said closed-loop path.

7. The apparatus of claim 1 wherein said bias control signal generating means generates said bias control signal as a function of a plurality of said phase angle values having the same first time derivative value, $d\psi/dt$, and having the same polarity of the second time derivative value $d\psi/dt$ of said phase relationship.

8. The apparatus of claim 2 wherein said first selected function is a trigonometric function.

9. The apparatus of claim 3 wherein said bias control signal generating means includes lock-in error parameter means for determining at least a first lock-in error parameter which corresponds to the accumulation of lock-in error in said first sensor signal, said lock-in error parameter means including:

function means for obtaining values of at least a first selected function evaluated for selected ones of said phase angle values; and accumulating means for summing said first function values thereby providing a first lock-in error parameter, said bias control signal being a function of said first lock-in error parameter.

10. The apparatus of claim 1 wherein said bias control signal generating means includes lock-in error parameter means for determining a plurality of lock-in error parameters including at least first and second ones which correspond to the accumulation of lock-in error in said first sensor signal, said lock-in error parameter means including:

function means for obtaining values of at least a first selected function evaluated for selected ones of said phase angle values having a first polarity of the second time derivative of said phase relationship, and for obtaining values of at least a second function evaluated for selected ones of said phase angle values having a second polarity of the second time derivative of said phase relationship; and accumulating means for separately summing values of said first and second selected functions thereby providing first and second lock-in error parameters, said bias control signal being a function of said first and second lock-in error parameters.

11. The apparatus of claim 3 wherein said bias control signal generating means includes lock-in error parameter means for determining a plurality of lock-in error parameters including at least first and second ones which correspond to the accumulation of lock-in error in said first sensor signal, said lock-in error parameter means including:

function means for obtaining values of at least a first selected function evaluated for selected ones of said phase angle values having a first polarity of the second derivative of said phase relationship, and for obtaining values of at least a second function evaluated for selected ones of said phase angle values having a second polarity of the second time derivative of said phase relationship; and accumulating means for separately summing values of said first and second selected functions thereby providing said first and second lock-in error parameters, said bias control signal being a function of said first and second lock-in error parameters.

12. The apparatus of claim 2 wherein said bias control signal generating means includes signal processing means for determining said bias control signal so as to cause a predetermined phase angle value at a first selected occurrence of a selected first time derivative value of said phase relationship, said signal processing means including means, responsive to said at least a first lock-in error parameter, for determining said predetermined phase angle value so that lock-in error in said sensor is reduced toward a minimum.

13. The apparatus of claim 1 wherein said bias control signal generating means includes signal processing means responsive to said phase angle values for determining desired phase angle values as a function of occurring ones of said phase angle values at a number of occurrences of said selected first time derivative value, having a zero value, so that said lock-in error in said first sensor signal is reduced.

14. In an angular rate sensor of the class wherein two waves travel in opposite directions, each wave substantially traveling about a closed-loop path, wherein the frequency of each of said waves is a function of the rate of rotation of said closed-loop path and there being a phase relationship established between said waves also being a function of the rate of rotation of said closed-loop path, and wherein said sensor generates a first sensor signal related to the true angular rotation of said sensor but which includes lock-in error inherent in said sensor, the improvement comprising:

sensing means responsive to at least one of said waves for providing at least one output signal which is indicative of said phase relationship;

phase angle determining means responsive to said sensing means output signal for determining a phase angle value, $\psi$, corresponding to said phase relationship between said waves at selected occurrences of those times when the first time derivative value of said phase relationship is zero;

biasing means, having an input terminal adapted to receive a bias control signal, for varying the frequency difference between said waves so as to the alternate in sign, said biasing means including means for varying at least one of said waves such that the phase angle, $\psi$, of said phase relationship takes on selected values in response to said bias control signal at selected occurrences of those times when the first time derivative value of said phase relationship, $d\psi/dt$, is zero; and signal processing means for generating said bias control signal as a function of a plurality of selected ones of said phase angle values at past occurrences of said first time derivative being zero so that said lock-in error in said first sensor signal is driven toward a minimum.

15. The apparatus of claim 14 wherein said two waves are waves of electromagnetic radiation.

16. The apparatus of claim 15 wherein said two waves of electromagnetic radiation are in the form of laser beams and said laser beams travel in opposite directions about said closed-loop path.

17. The apparatus of claim 14 wherein said biasing means includes means for oscillating said angular rate sensor in a rotational mode, back and forth.

18. The apparatus of claim 1, 4, or 14 where said biasing means introduces a frequency bias in each of said waves such that the frequency difference therebetween varies in a sinusoidal manner.

19. An angular rate sensor comprising:

support means for supporting two waves propagating substantially about a closed-loop path in opposite directions, the frequency of each of said waves being a function of the rate of rotation of said closed-loop path and there being a phase relationship established between said waves also being a function of the rate of rotation of said closed-loop path;

sensing means for providing at least one output signal indicative of said phase relationship;

first signal processing means responsive to said sensing means at least one output signal for providing a first sensor signal representative of rotation of said closed-loop path but which includes an accumulation of lock-in error inherent in said sensor;

phase angle determining means responsive to said sensing means output signal for determining a phase angle value, $\psi$, corresponding to said phase relationship between said waves at each of selected occurrences of selected first time derivative values, $d\psi/dt$ of said phase relationship;

biasing means, having an input terminal adapted to receive a bias control signal, for introducing a varying the frequency bias in at least one of said waves, resulting in a rate of change of said phase relationship to pass through zero at least once, said biasing means including means for varying at least one of said waves such that the phase angle, $\psi$, of said phase relationship takes on selected values in response to said bias control signal at selected first time derivative values, $d\psi/dt$, of said phase relationship;

bias control signal generating means for generating said bias control signal as a function of a plurality of ones of selected said phase angle values at past occurrences of said selected first time derivative values of said phase relationship such that said accumulation of lock-in error in said first sensor signal is driven toward a minimum.

20. The apparatus of claim 19 wherein said bias control signal generating means includes lock-in error parameter means for determining at least a first lock-in error parameter which corresponds to the accumulation of lock-in error in said first sensor signal, said lock-in error parameter means including:

function means for obtaining values of at least a first selected function evaluated for selected ones of said phase angle values; and accumulating means for summing said first function values thereby providing a first lock-in error parameter, said bias control signal being a function of said first lock-in error parameter.

21. The apparatus of claim 20 wherein said bias control signal generating means includes signal processing means for determining said bias control signal so as to cause a predetermined phase angle value at a first selected occurrence of a selected first time derivative value of said phase relationship, said signal processing means including means, responsive to said at least a first lock-in errorl parameter, for determining said predetermined phase angle value so that lock-in error in said sensor is reduced toward a minimum.

22. The apparatus of claim 21 wherein said two waves are waves of electromagnetic radiation.

23. The apparatus of claim 22 wherein said two waves of electromagnetic radiation are in the form of laser beams and said laser beams travel in opposite directions about said closed-loop path.

24. The apparatus of claim 21 wherein said biasing means includes means for oscillating said angular rate sensor in a rotational mode, back and forth.

25. The apparatus of claim 4, 10, or 11 wherein said bias control signal generating means includes signal processing means for determining said bias control signal so as to cause a predetermined phase angle value at a first selected occurrence of a selected first time derivative value of said phase relationship, said signal processing means including means, responsive to said plurality of lock-in error parameters, for determining said predetermined phase angle value so that lock-in error in said sensor is reduced toward a minimum.

26. The apparatus of claim 11 wherein said bias control signal generating means includes signal processing means for determining said bias control signal so as to cause a first predetermined phase angle value to occur at a first selected occurrence of a selected first time derivative value of said phase relationship having a corresponding second time derivative value of a first polarity, and to cause a second predetermined phase angle value to occur at a second selected occurrence of a selected first time derivative value having a corresponding second time derivative value of a second polarity, and said signal processing means including means responsive to at least said first and second ones of said plurality of lock-in error parameters, for determining said first and second predetermined phase angle values so that said lock-in error in said sensor is reduced toward a minimum.

27. The apparatus of claim 25 wherein said two waves are waves of electromagnetic radiation.

28. The apparatus of claim 27 wherein said two waves of electromagnetic radiation are in the form of laser beams and said laser beams travel in opposite directions about said closed-loop path.

29. The apparatus of claim 26 wherein said biasing means includes means for oscillating said angular rate sensor in a rotational mode, back and forth.

30. The apparatus of claim 26 wherein said first predetermined phase angle value is a function of the arc tan function of a first ratio of selected ones of said plurality of lock-in error parameters, and said second predetermined phase angle value is a function of an arc tan function of a second ratio of selected ones of said plurality of lock-in error parameters.

31. The apparatus of claim 30 wherein said first predetermined phase angle value is substantially of the form:

$$\tan^{-1}\left[\frac{-F_2}{-F_1}\right]$$

and said second predetermined phase angle value substantially of the form:

$$\tan^{-1}\left[\frac{-F_4}{-F_3}\right]$$

32. The apparatus of claim 26 wherein said first predetermined phase angle value is substantially of the form:

$$\tan^{-1}\left[\frac{-F_1^*}{-F_2^*}\right]$$

and said second predetermined phase angle value substantially of the form:

$$\tan^{-1}\left[\frac{-F_2{}^*}{F_1{}^*}\right]$$

where F1* and F2* are said lock-in error parameters defined by:

$$F_1{}^* = \sum_{j=1}^{m} \Delta F_{1j} - \sum_{j=1}^{m} \Delta F_{3j}$$

$$F_2{}^* = \sum_{j=1}^{m} \Delta F_{2j} + \sum_{j=1}^{m} \Delta F_{4j}$$

33. The apparatus of claim 19 where said biasing means introduces a frequency bias in each of said waves such that the frequency difference therebetween varies in a sinusoidal manner.

34. The apparatus of claim 19 wherein said bias control signal generating means includes signal processing means responsive to said phase angle values for determining desired phase angle values as a function of occurring ones of said phase angle values at a number of occurrences of said selected first time derivative value, having a zero value, so that said lock-in error in said first sensor signal is reduced.

35. A ring laser angular rate sensor comprising:
support means for supporting two waves of substantially monochromatic light beams propagating substantially about a closed-loop path in opposite directions, the frequency of each of said waves being a function of the rate of rotation of said closed-loop path, and there being a phase relationship established between said waves also being a function of the rate of rotation of said closed-loop path;
biasing means for oscillating said support means back and forth in a rotational mode so as to produce an alternating frequency bias in the frequency of said waves resulting in a rate of change of said phase relationshp to pass through zero at least once, said biasing means including means for varying at least one of said waves such that the phase angle, ψ, corresponding to said phase relationship takes on selected values in response to said bias control signal at selected occurrences of those times when selected first time derivative values of said phase relationship, dψ/dt, occur;
sensing means responsive to at least one of said waves for providing at least one output signal indicative of said phase relationship;
first signal processing means responsive to said sensing means at least one output signal for providing a first signal representative of the rotation of said closed-loop path but which includes an accumulation of lock-in error inherent in said sensor;
bias control signal generating means responsive to said sensing means at least one output signal for generating said bias control signal so that said lock-in error in said first sensor signal is driven toward a minimum, said bias control signal generating means including,
phase angle determining means responsive to said sensing means output signal for determining said phase angle value, ψ, corresponding to said phase relationship between said waves at each of selected occurrences of selected first time derivative values, dψ/dt of said phase relationship;

function means for obtaining values of at least a first selected function evaluated for selected ones of said phase angle values having a first polarity of the second time derivative of said phase angle, and for obtaining values of at least a second function evaluated for selected ones of said phase angle values having a second polarity of the second time derivative of said phase relationship,
accumulating means for separately summing values of said first and second selected functions thereby providing first and second lock-in error parameters; and
second signal processing means responsive to said first and second lock-in error parameters for determining said bias control signal so as to cause a predetermined phase angle value at a first selected occurrence of a selected first time derivative value, dψ/dt, of said phase relationship such that said lock-in error in said first sensor signal is driven toward a minimum.

36. The apparatus of claim 35 wherein:
said phase angle determining means includes means capable of determining said phase angle values in which said selected first time derivative values are substantially zero.

37. The apparatus of claim 36 wherein said bias control signal generating means includes:
means responsive to said sensing means first output signal for determining a second time derivative value corresponding to each occurrence of said selected first time derivative value; and
said function means including means for generating a plurality of incremental error parameters being substantially of the form $$\Delta F_1 = \frac{\cos\psi_o{}^+}{\sqrt{|\ddot{\psi}_o{}^+|}} \quad \Delta F_3 = \frac{\cos\psi_o{}^-}{\sqrt{|\ddot{\psi}_o{}^-|}}$$

$$\Delta F_2 = \frac{\sin\psi_o{}^+}{\sqrt{|\ddot{\psi}_o{}^+|}} \quad \Delta F_4 = \frac{\sin\psi_o{}^-}{\sqrt{|\ddot{\psi}_o{}^-|}}$$

where
$\ddot{\psi}_o{}^+$, $\ddot{\psi}_o{}^-$ are positive and negative values of said second derivative value, respectively;
$\psi_o{}^+$ is said phase angle when $\ddot{\psi}$ is positive;
$\psi_o{}^-$ is said ZRC phase angle when $\ddot{\psi}$ is negative; and
$\Delta F_1 \ldots$ are said incremental error parameters; and
said accumulating means including means for separately summing said plurality of said incremental error parameters thereby providing a plurality of lock-in error parameters including those having substantially the functional form $$F_i = f\left\{\sum_{j=1}^{m} \Delta F_{ij}\right\} \text{ where } i = 1,2,3,4$$

where the summation, m, occurs for each occurring one of said selected first time derivatives having the same polarity of said corresponding second derivative, and i is one of said plurality of incremental error parameters, said lock-in error signal being a function of said plurality of lock-in error parameters.

38. The apparatus of claim 36 wherein said second signal processing means includes means for determining said bias control signal so as to cause a predetermined phase angle value at a first selected occurrence of a selected first time derivative value of said phase relationship, and means responsive to said at least a first lock-in error parameter, for determining said predetermined phase angle values so that lock-in error in said sensor is reduced toward a minimum.

39. The apparatus of claim 36 wherein said second signal processing means includes means for determining said bias control signal so as to cause a first predetermined phase angle value to occur at a first selected occurrence of a selected first time derivative value of said phase relationship having a corresponding second time derivative value of a first polarity, and to cause a second predetermined phase angle value to occur at a second selected occurrence of a selected first time derivative value having a corresponding second time derivative value of a second polarity, and means, responsive to said plurality of said lock-in error parameters, for determining said first and second predetermined phase angle values so that said lock-in error in said sensor is reduced toward a minimum.

40. The apparatus of claim 35 wherein said two waves are waves of electromagnetic radiation.

41. The apparatus of claim 40 wherein said two waves of electromagnetic radiation are in the form of laser beams and said laser beams substantially travel in opposite directions about said closed-loop path.

42. The apparatus of claim 35 wherein said transducing means includes at least one photodetector.

43. The apparatus of claim 1, 4, 7, or 10 wherein said biasing means includes means for oscillating said angular rate sensor in a rotational mode, back and forth.

44. The apparatus of claim 1, 2, 14, 19 or 35 including:
first signal processing means responsive to said at least one output signal of said sensing means for substantially continuously obtaining a lock-in error signal representative of said lock-in error in said first sensor signal; and
means for combining said first sensor signal and said error signal and providing a second sensor signal representative of said rotation of said closed-loop path substantially free of lock-in error components.

45. A method of reducing lock-in error in an angular rate sensor of the class wherein two electromagnetic waves travel in opposite directions, each wave substantially traveling about a closed-loop path, wherein the frequency of each of said waves is a function of the rate of rotation of said closed-loop path and there being a phase relationship established between said waves also being a function of the rate of rotation of said closed-loop path, and wherein said sensor generates a first sensor signal related to the true angular rotation of said sensor but which includes lock-in error inherent in said sensor and said sensor including a biasing means capable of producing a frequency bias in the frequency of said waves so that the rate of change of said phase relationship passes periodically through zero, the method comprising:
determining the phase angle, $\psi$, corresponding to said phase relationship between said waves at occurrences of the first time derivative of said phase relationship passing through zero;
determining values of a first selected function evaluated for said phase angle values in which the second time derivative of said phase relationship is of a first polarity;
determining values of a second selected function evaluated for said phase angle values in which the second time derivative of said phase relationship is of a second polarity;
separately accumulating said first and second function values thereby producing first and second sums, respectively;
determining lock-in error reducing phase angle values, for subsequent occurrences of said first time derivative of said phase relationship passing through zero in which said lock-in error reducing phase angle values are a function of said first and second sums so that said sums will be reduced toward a minimum; and
altering at least one of said waves so as to cause said lock-in error reducing phase angle values.

* * * * *